United States Patent
von Wolske

(10) Patent No.: US 7,316,595 B2
(45) Date of Patent: Jan. 8, 2008

(54) PROPELLER POSITIONING SYSTEM WHICH CONSTRAINS THE PROPELLER TO FOLLOW A PATH GENERALLY PARALLEL TO THE BOTTOM SURFACE OF A BOAT

(76) Inventor: James P. von Wolske, 2107 Lakeshore Dr., Austin, TX (US) 78746

( * ) Notice: Subject to any disclaimer, the term of this patent is extended or adjusted under 35 U.S.C. 154(b) by 697 days.

(21) Appl. No.: 10/992,253

(22) Filed: Nov. 18, 2004

(65) Prior Publication Data

US 2005/0070180 A1   Mar. 31, 2005

Related U.S. Application Data

(63) Continuation of application No. 10/154,117, filed on May 23, 2002, now Pat. No. 6,823,812.

(60) Provisional application No. 60/293,618, filed on May 25, 2001.

(51) Int. Cl.
*B63H 5/125* (2006.01)
(52) U.S. Cl. .......................... 440/55; 440/62
(58) Field of Classification Search ................. 440/55, 440/61, 62
See application file for complete search history.

(56) References Cited

U.S. PATENT DOCUMENTS

| | | | |
|---|---|---|---|
| 3,200,782 A | 8/1965 | Walden | |
| 3,242,899 A * | 3/1966 | Hanson | 440/62 |
| 3,430,603 A * | 3/1969 | Parish | 440/63 |
| 3,565,030 A | 2/1971 | Curtis | |
| 4,544,362 A | 10/1985 | Arneson | |
| 4,597,742 A | 7/1986 | Finkl | |
| 4,645,463 A | 2/1987 | Arneson | |
| 4,815,996 A | 3/1989 | Carr | |
| 4,846,741 A | 7/1989 | Betsinger | |
| 4,896,622 A | 1/1990 | Thomas | |
| 4,909,175 A | 3/1990 | Arneseon | |
| 5,100,350 A | 3/1992 | Buzzi | |
| 5,171,175 A | 12/1992 | Buzzi | |
| 5,215,029 A | 6/1993 | Davis | |
| 5,549,493 A * | 8/1996 | Bezzi | 440/61 R |
| 5,667,415 A | 9/1997 | Arneson | |
| 5,755,605 A | 5/1998 | Asberg | |
| 6,464,549 B2 | 10/2002 | Buzzi | |
| 2004/0014376 A1 | 1/2004 | Noyes | |

* cited by examiner

Primary Examiner—Jesús D Sotelo
(74) Attorney, Agent, or Firm—Gary R. Stanford

(57) ABSTRACT

A propulsion system for a boat including a drive system and a propeller positioning system. The drive system may be of any type, such as outboard motors, inboard/outboard drives, surface drives, etc. The positioning system constrains movement of the propeller shaft to swing in a path generally parallel to the bottom surface of the boat. The boat has a hull with either a flat or a sloped bottom surface. Various positioning systems include bite bars, bite rams, cambered drives, jack boxes, jack plates and various linkage configurations. In one aspect a tie bar links multiple drives together. In another aspect, a four-bar steering linkage enables variations in immersion depths of multiple propellers while maintaining constant toe-in. In yet another aspect, yaw steering is achieved using differential immersion between multiple propellers.

36 Claims, 14 Drawing Sheets

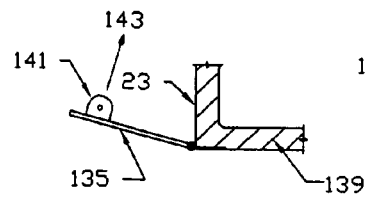 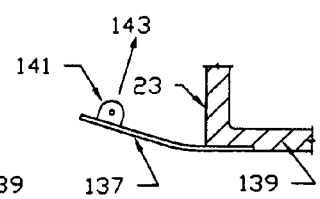 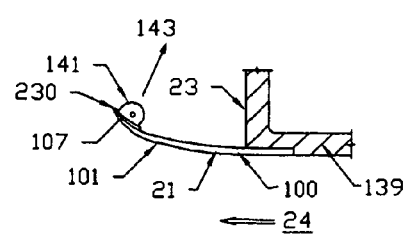
Fig. 7U     Fig. 8U     Fig. 9U
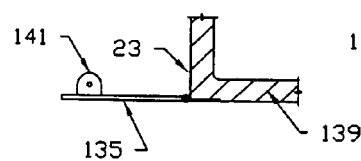 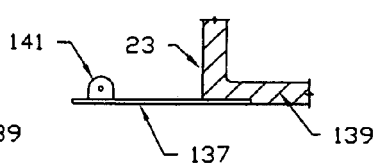 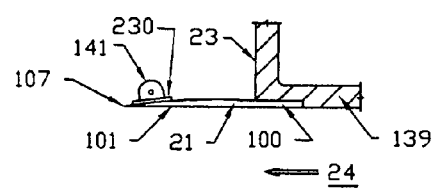
Fig. 7N     Fig. 8N     Fig. 9N
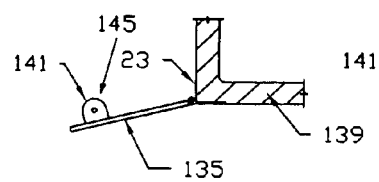 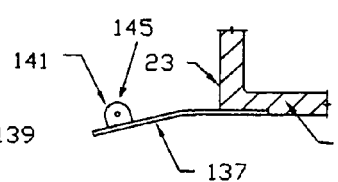 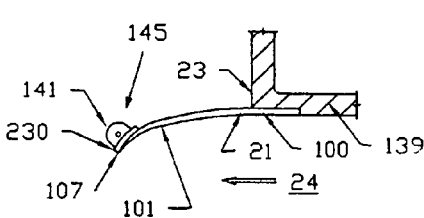
Fig. 7D     Fig. 8D     Fig. 9D

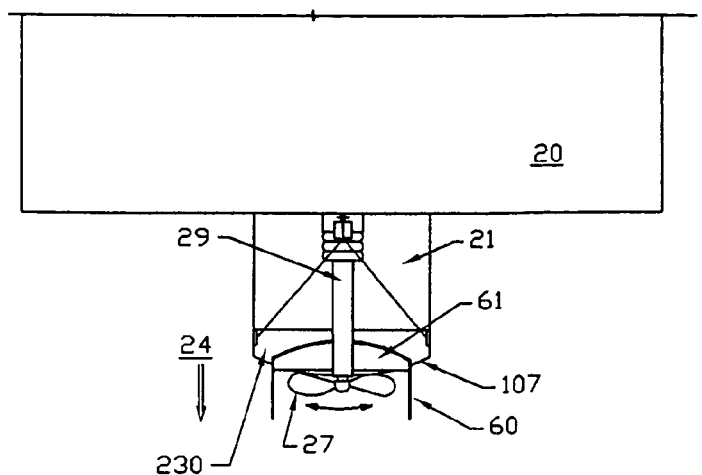
Fig. 15T
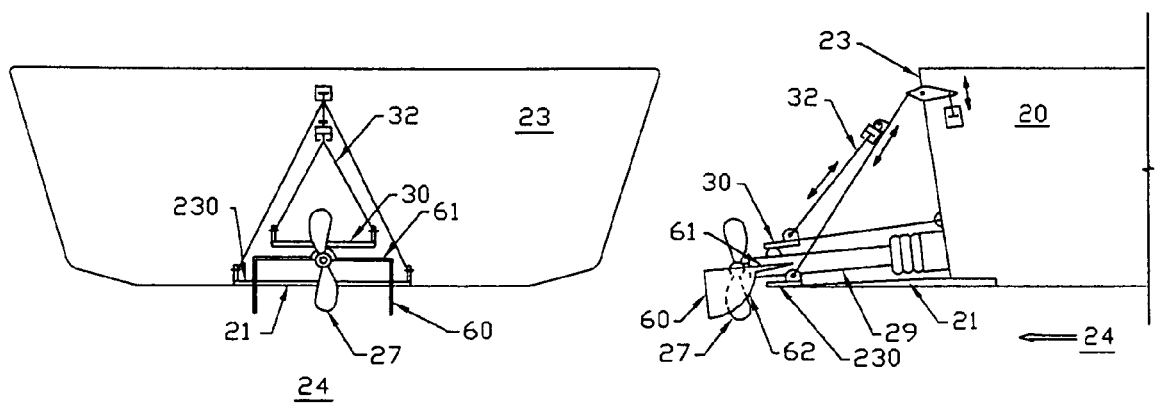
Fig. 15R
Fig. 15S

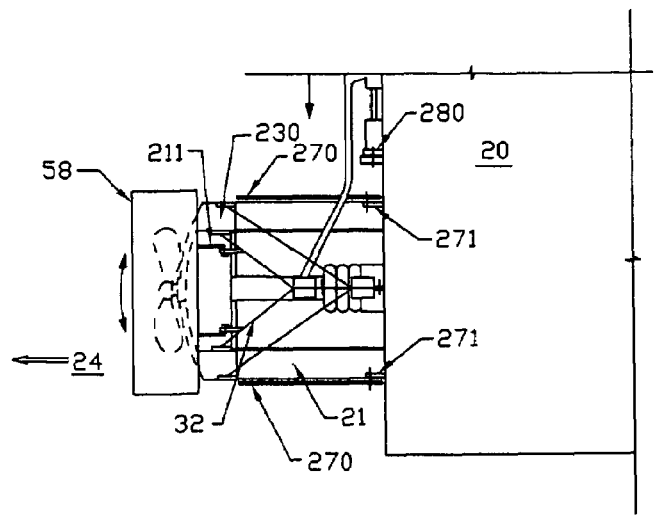
Fig. 20T
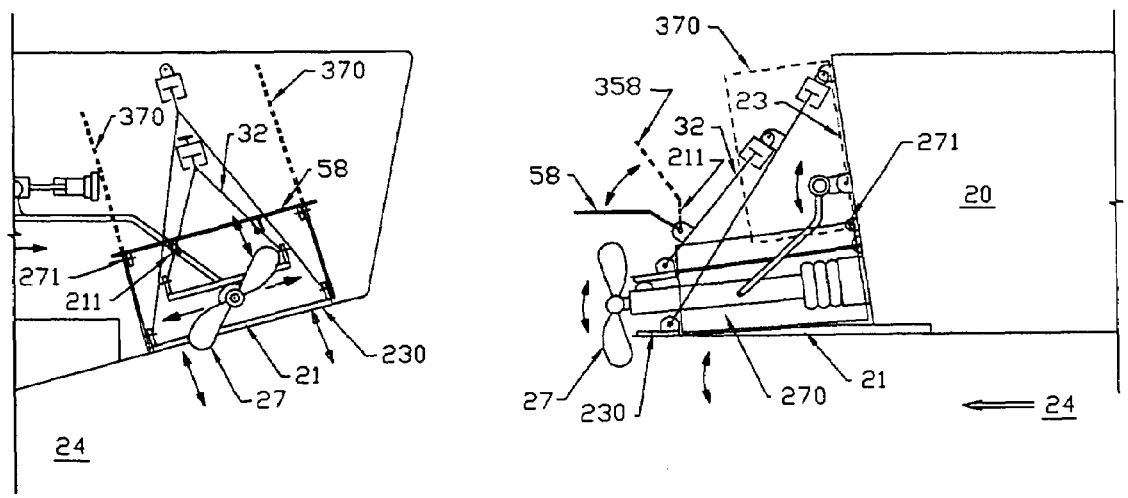
Fig. 20R
Fig. 20S

PROPELLER POSITIONING SYSTEM WHICH CONSTRAINS THE PROPELLER TO FOLLOW A PATH GENERALLY PARALLEL TO THE BOTTOM SURFACE OF A BOAT

CROSS-REFERENCE TO RELATED APPLICATION(S):

The present application is a continuation of U.S. Patent Application entitled "TRIM TABS AND SURFACE DRIVE PROPELLER BITE CONTROL", Ser. No. 10/154,117 filed May 23, 2002 now U.S. Pat. No. 6,823,812, which is based on U.S. Provisional Patent Application entitled "Boat Trim Tabs and Surface Piercing Propeller Drive", Ser. No. 60/293,618 filed May 25, 2001, both of which being hereby incorporated by reference in their entireties.

BACKGROUND OF THE INVENTION

1. Field of the Invention

The present invention relates to boat propulsion, and more specifically to a propeller positioning system which constrains the propeller to follow a path generally parallel to the bottom surface of the boat.

2. Description of the Related Art

Trim tabs have been used to change the "attitude" of a boat. Attitude is the angle of the boat relative to the water surface, and changes under different operating conditions. The attitude of a boat relative to the water surface has a profound effect on the speed and efficiency of the boat. Attitude is usually discussed in terms of the nose up/nose down adjustment of the boat, and is sometimes called the trim angle. The term "trim angle" often leads to ambiguity as to whether it is the angle of the boat, or the tabs, or the outdrive being discussed. The present disclosure attempts to be more specific in discussing trim angle.

Trim tabs are usually fastened to the boat at or near the stern and on the transom or on the bottom of the hull. The transom generally forms the rearmost portion of the stern, such as the generally flat and vertical rearward end of the chassis of the boat. When underway, water rushes under the boat, causing the rear of the boat to be deflected up or down by the trim tabs. Pushing the trim tab down deflects the departing water downward to boost the rear of the boat up into the air slightly, thus bringing the bow of the boat down. Pulling the trim tab up is intended to pull the rear of the boat down and to bring the bow up. Thus, "down on the tabs" means "down on the bow" and, conversely, "up on the tabs" means "up on the bow". It is noted, however, that the "up on the tabs" operation of prior art trim tabs has limited effectiveness. Attitude may sometimes be discussed in terms of the left or right lean of a boat under way. Leaning may be due to propeller torque, uneven weight distribution, or cornering. Trim tabs may also be used correct this leaning.

Although trim tabs are an appurtenance to the hull, they serve to modify the shape of the planing surface and, therefore, from the perspective of hydrodynamics of the boat planing on the water, it is immaterial whether the tabs are considered as part of the hull or an appurtenance.

Prior art trim tabs are only somewhat effective in changing the attitude of the boat. Early prior art trim tabs were hinged where they joined the hull of the boat and usually were a rigid flat plate essentially parallel to the bottom surface of the hull. This flat plate could swing up or down several degrees via mechanical means. A major deficiency of flat plate hinged tabs is that the up tab position causes an abrupt change in the contour of the surface running on the water. This abrupt change causes flow separation at the hinge point. As with any airfoil, flow separation causes loss of lift. The hinged flat plate is simply a crude airfoil with poor lift to drag ratio and is not very successful at raising the nose of the boat. Hinge type tabs in the down position will lower the bow of the boat, but have a poor lift to drag ratio and tend to impose excessive drag in order to generate an equivalent amount of lift of present invention.

More recent prior art trim tabs are of a bending flat plate type whereby the tab is a resilient plate of uniform thickness and stiffness. A flat plate is attached solidly in a cantilever fashion to the boat hull and does not use a hinged joint but rather relies on the bending of the flat plate slightly up or down to generate a somewhat better, but still deficient, approximation of an airfoil. The bending flat plate trim tabs were flexed down and up by the boat operator to add hook or rocker as desired. Hook is usually caused by a concave surface on the bottom of the boat, when viewed from below the boat, which tends to lower the bow while underway. Rocker is usually caused by a convex surface on the bottom of the boat, when viewed from below the boat, which tends to raise the bow of the boat while underway. The bending flat plate trim tabs were slightly more effective than hinged type plates. Although somewhat superior to hinged plate designs, the bending flat plate also has excessive drag for the amount of lift generated. Bending flat plate trim tabs are somewhat better than the hinged type in that the problematic abrupt change of angle of the hinge type is softened. This curved surface method decreases the tendency of flow separation, but uses a plate of constant flexural stiffness, so that the curvature is fairly localized and diminishes as the water moves away from the area of attachment of the plate to the hull.

The attitude of a boat may also be changed by changing the thrust angle of the propeller as ordinarily found on outboard motors and on inboard/outboard propulsion systems. This function is normally controlled by a "trim" switch, which is part of an electro-hydraulic system. This method of changing the attitude of the boat and lifting or depressing the stern of the boat by changing the thrust angle of the propulsion is not as efficient as optimizing the thrust vector to be essentially parallel to the direction of travel and then adjusting the hull geometry to optimize the hydrodynamic lift to drag ratio.

Surface piercing drives are well known and are usually referred to as surface drives. One common type is mounted to project out the stern of the boat so that the propeller is located at the far aft or rearward end of an extended quasi-cylindrical thrust tube. Surface drives are designed to allow only the lower half of the propeller to be in the water at design operating conditions. In other words, surface drives only operate on the surface of the water. The depth to which the propeller is actually immersed in the water at any given operating speed has a major effect on the resistive torque load imposed on the engine. Therefore, it is desirable to vary the depth of immersion as needed but to also be able to closely control this depth to something less than half of the propeller diameter under all normal operating conditions. The propeller blade immersion or depth of partial immersion of the propeller is referred to herein as "bite".

Surface piercing propeller drives are known to be very efficient propulsion systems. The most versatile surface drives have a means for thrust vectoring by changing the horizontal and vertical alignment of the propeller shaft with respect to the stern of the boat. This realignment is accomplished via a universal joint where the drive shaft exits the hull near the transom and connects to the propeller shaft.

Mechanical means, usually of electrohydraulic cylinders push and pull the thrust tube in a preferred horizontal sweep or a vertical sweep. The horizontal sweep controls the steering of the boat, and the vertical sweep controls the trim of the boat. The steering sweep is somewhat effective, but the vertical sweep for controlling trim is rather deficient.

Surface drives have two primary advantages. The first advantage is that they have very little drag as only the propeller and skeg are in the water. The skeg is a fin that is affixed to the underside of the drive at a location forward of the propeller and that has a leading edge which sweeps generally downward and rearward. The skeg is supposed to protect the propeller from objects in the water and conversely to protect objects from the propeller. Neither is very successful. The skeg is also intended to contribute to the steering, but because a surface drive has a steerable thrust vector, the skeg has only a minimal contribution to the steering, especially when under power.

The skeg imposes undesirable drag and also slices a groove in the water as the water approaches the propeller blades. In this manner, the skeg causes a major disruption in the homogeneous flow field of water into which the blades are progressing as the propeller screws itself into the water. Although there is a performance penalty due to the drag forces of the skeg in the water, there is an added performance penalty over and above that simple drag force due to the field disruption and aeration of the water ahead of the propeller. This is why many competitive race boats place the rudder, if necessary for steering, off to the side of the propeller so as not to interfere with the flow field in proximity of the propeller.

The second primary advantage of surface drives is that the propeller is designed to be in a ventilating mode at normal operating conditions. In contrast, most inboards and outdrives with submerged propellers use nonventilating propellers and hence they have a maximum theoretical speed limit before the propeller goes into the cavitation mode and loses its grip. A propeller designed to be nonventilating does not work well in a ventilating mode and conversely, a propeller designed to operate in the ventilating mode, which is sometimes referred to as "hyperventilating" mode, does not work well in a nonventilating mode. There is no maximum speed for a ventilating or hyperventilating propeller as there is for a nonventilating propeller.

Surface drives have a disadvantage of not backing up very well. This is caused by the propeller back wash impinging on the transom of the boat and nullifying the reversing thrust. In contrast, non surface drive boats have their propellers immersed deep enough to let the reverse propeller wash carry under the hull. Surface drives also have a disadvantage of presenting an exposed propeller at the surface of the water such that a passenger could fall into contact with the blades more easily than with submerged propeller type of drives.

With ordinary full immersion outdrives and outboard motors, the trim effect on the boat can be accomplished by tilting the lower unit as "trim out" or "trim in", hence tilting the thrust vector up or down, to raise or lower the nose of the boat. However, as previously discussed, the vertical thrust vectoring of the propulsion system is inefficient compared to the preferred trimming of the hull through the use of trim tabs. Using the up trim on a surface drive has a very weak effect on the attitude of the boat and usually only tends to pull the propeller too far out of the water causing the engine to overspeed. Using the down trim immerses the propeller too far into the water causing the engine to slow down due to overload. In general, the up and down trim of a surface drive affects the bite of the propeller much more than it affects the attitude of the boat.

Controlling the bite of the propeller has the same effect as that of changing the pitch of the propeller, or changing the propeller diameter, or even changing the gear ratio of the transmission. The difficult part of controlling this bite is that the water depth on the surfacing propeller is influenced by wave action, boat bounce, cornering, or speed changes. Controlling the bite is advantageous in that it is like having an infinitely adjustable transmission to match the engine performance to the propeller load. However, sporadic changes in bite are not desirable because it is hard on the drive train, it makes the boat difficult to control, and it may be dangerous to the occupants.

Another disadvantage of surface drives is that they tend to crawl sideways due to having only the lower half of the propeller in the water, which thus imparts a net sideways force on the propeller. In other words, the propeller tries to crawl the back of the boat to the side. Side crawl pulls the thrust tube to one side and if the steering wheel is released, the boat turns sharply to that side, but if the wheel is held straight ahead, the boat veers to the other side following what is known as the "crabbing angle". If the boat has two surface drives mounted on the transom in the ordinary fashion, and they are rotating in opposite directions, the side forces tend to cancel and the boat does not crawl to the side. It is important to note, however, that under normal conditions such as wave action, boat bounce, cornering, and speed changes, one propeller can dig into the water deeper than its twin and therefore cause the boat to momentarily crawl sideways. This side motion can be chronic, unpredictable, and fatiguing to the driver.

Another disadvantage of surface drives is that the boat tends to struggle to get up on plane. Because the torque output of an engine is low at low revolutions per minute (RPM) and because the propeller is fully immersed, or "flooded", at low speeds, surface drive boats often have a difficult time getting over "hump speed", which is that speed when the boat actually starts to plane and the drag forces tend to decrease. The previous ways to overcome this bogging down effect is to use a multi-speed transmission, or to vastly overpower the boat with a very powerful motor.

Another disadvantage with surface drive boats is they may tend to "blow over" at high speeds. Blow over means that the boat goes airborne, nose up, and does a complete back flip. Blow over starts with too much nose up, then the hull starts "kiting", and the propeller continues to run up under the boat, and it flips over. Although other high speed boats also blow over, the surface drive may be worse in that, as the bow of the boat starts to rise up, the extended propeller is dunked under the water surface as the boat tends to rise up on its bottom surface at the stern thus adding to the blow over condition.

Prior boat designs do not address the changing bite associated with wave action, or hull bounce, or changes in speed, or the fact that the plane of water leaving the bottom of the craft when turning is not in the same plane as when the craft is traveling in a straight line. Prior designs do not address the uncontrolled bite problem. Rather, the driver is forced to make continual up and down changes on the prior art hydraulic cylinder, which is attached to the thrust tube, to try to compensate for these continually changing operating conditions.

BRIEF DESCRIPTION OF THE DRAWINGS

The benefits, features, and advantages of the present invention will become better understood with regard to the following description, and accompanying drawings in which:

FIGS. 7U, 7N, 7D illustrate earliest prior art of hinged trim tabs in up (U), neutral (N), and down (D) positions, respectively.

FIGS. 8U, 8N, 8D illustrate earlier prior art of bending flat plate trim tabs in up (U), neutral (N), and down (D) positions, respectively.

FIGS. 9U, 9N, 9D illustrate trim tabs in accordance with an embodiment of the present invention in up (U), neutral (N), and down (D) positions, respectively.

FIGS. 15S, 15R, 15T are side (S), rear (R), and top (T) views, respectively, of side mounted bias fins mounted near the propeller and used to counteract the side crawl forces due to the surface propeller.

FIGS. 20S, 20R, and 20T are side (S), rear (R), and top (T) views, respectively, illustrating a retractable guard mounted to the trim tab, or outdrive, mechanism to protect people from propeller inflicted injuries.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1T:
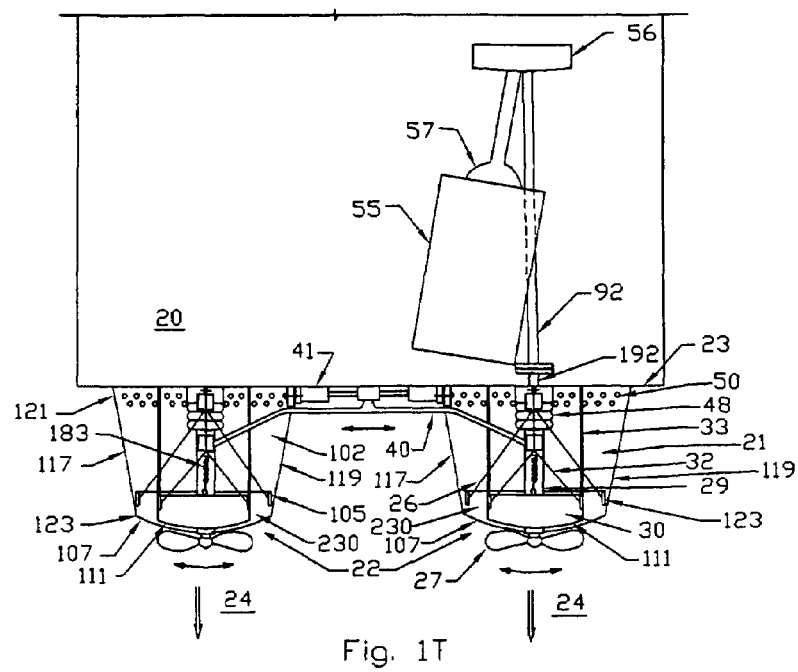
FIGS. 1S, 1R, 1T are side (S), rear (R), and top (T) views, respectively, of the stern portion of a surface drive boat illustrating trim tabs according to an embodiment of the present invention, with fluid ejection ports, combined with surface drive units to achieve bite control of the surfacing propeller(s).
Figure 1R:
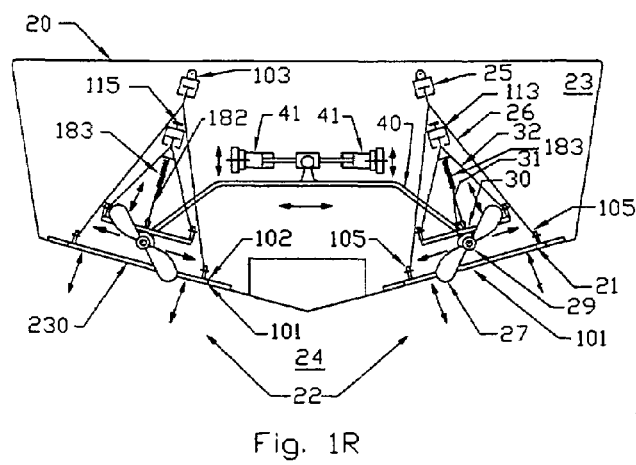
Figure 1S:
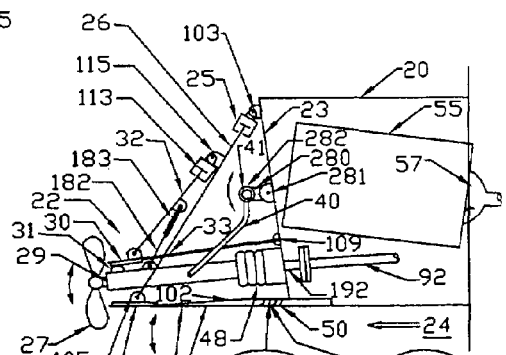

FIGS. 1S, 1R, and 1T are side (S), rear (R), and top (T) views, respectively, of the stern portion of a boat 20 illustrating an exemplary embodiment of the present invention. It is noted that the reference numeral 20 is used to generally reference each of several boat configurations, such as V-hull boats, flat bottom boats, catamarans, etc., where the particular boat configuration is shown in the Figures and corresponding descriptive text. Also, for simplicity, the description herein often refers to components in the singular, although it is understood that duplicate or complimentary components are often shown or otherwise included, such as, for example, for twin or dual-drive configurations. It is also noted that only the stern portion of the boat, including, in some instances, a transom 23 of the boat, is illustrated as the present invention primarily involves modifications and improvements thereto.

Attached to the stern of the boat 20 is at least one cantilevered trim tab 21 of "regressive flexural stiffness", which is mounted to the underside of the stern of the boat 20 under a surface drive 22, which is also mounted through a transom 23 at the stern end of the boat 20. The surface drive 22 is an assembly of subcomponents which makes a working outdrive portion of a propulsion system. The surface drive 22 generally includes a propeller or "surfacing" propeller 27 mounted to a propeller shaft 144 (shown in FIG. 19T) journaled inside a corresponding thrust tube 29. The surface drive 22 also usually includes a universal joint (see, for example, universal joint 84 shown in FIG. 18) that rotatively couples the propeller shaft 144 to the surface drive input shaft 192 that extends forward from the transom 23. The thrust tube 29 is indirectly coupled to the transom 23 by an articulating joint, such as a large ball and socket, or gimbal 48, which surrounds the universal joint. Other propulsion systems not usually considered surface drives, such as, for example, an outboard motor 64 (FIG. 5) and an inboard/outboard (I/O) 66 (FIG. 6), can function as surface drives in context of present invention. I/O systems are also referred to herein as "outdrives".

As illustrated in FIGS. 9U, 9N, and 9D, each trim tab 21 includes a resilient plate 100 that has an operative bottom surface 101. The plate 100 is configured to be deflected in a variable and progressive curve from its forward end 121 (adjacent the boat 20) to its rearward end 123 (nearest the propeller 27) during operating conditions and when the rearward end is pulled up or pushed down. In the specific embodiment illustrated in FIGS. 1T, 1R and 1S, for example, the trim tab 21 includes a half-inch thick plate of aluminum with a taper cut upper, or top surface 102 so that the second moment of inertia of the cross section is regressive in the direction of water flow, illustrated by arrow 24, under the trim tab 21.

A trim ram 25 is coupled to a joint or clevis end 103 mounted to the boat 20, such as to the transom 23. The trim ram 25 is attached to a trim yoke 26, which is further coupled to one or more clevis ends 105 of the trim tab 21. In the embodiment shown, the trim yoke 26 is in the form of an inverted "V" including two rigid or stiff legs hinged to corresponding clevis ends 105 on a trim bar 230. The trim bar 230 is affixed to the rearward end of a corresponding trim tab 21. The trim bar 230 is a stiff member that prevents transverse cupping or bowing of the rearward edge of trim tab 21 due to hydrodynamic forces. The trim ram 25 is attached rigidly and coextensively to the apex of the inverted "V" shaped trim yoke 26 to prevent buckling at the junction of the piston rod of the trim ram and the trim yoke. The trim ram 25 controls the up and down motion of the trim tab 21. In the embodiment shown, for example, trim ram 25 is a two way hydraulic piston and cylinder. Each of the trim tabs 21 and the trim bar 230 have a curved rearward edge 107 having a radius that is concentric with or otherwise matches the arc of the side to side swing of the corresponding surface drive propeller 27 and the thrust tube 29.

The surface drive thrust tube 29 is held upwardly against a bite bar 30 by a tension member comprised of a cable 182 coupled to a bite bar yoke 32 and a tension spring 183 coupled to the thrust tube 29. The bite bar 30 is a rigid bar that has a curved rearward edge 111 that is concentric with or otherwise matches the arc of the side to side swing of the corresponding surface drive propeller 27 and the thrust tube 29. A low friction pad 31, or wheel, is mounted to the thrust tube 29 where it contacts the bite bar 30 to allow easy sliding, or rolling, motion between the two. The bite bar 30 is connected to a bite ram 113 by a second, stiffed legged inverted "V" member referred to as the bite yoke 32. The bite ram 113 is rigidly and coextensively attached at one end to the bite yoke 32 and attached at the other end to the trim yoke 26 by a clevis end 115 and therefore can control the vertical position of the bite bar 30, hence the thrust tube 29 and propeller 27, relative to the trim tab 21. The bite bar 30 is constrained to a hinged motion relative to the transom 23 by two bite bar arms 33 hinged to the transom 23 at corresponding hinged joints 109. Both bite and trim positions are connected to cable operated or electronic-based remote indicators (not shown) located at the driver's station of the boat 20.

The trim yoke 26 is configured to have independently extendable legs to allow minor adjustments to the amount of vertical skew imposed on the rearward end of the trim tab 21 relative to the plane of the bottom of the boat 20. For example, it is contemplated that some hook may be predisposed on one side of the trim tab 21 and some rocker predisposed on the other side of the trim tab 21 to optimize or improve its performance. Likewise, the bite yoke 32 is configured to have independently extendable legs to allow minor adjustments in the amount of vertical skew imposed on the bite bar 30 relative to the trim tab 21. Thus, it is contemplated to predispose the amount of propeller bite on one side of the swing arc of the thrust tube 29 relative to the other side of the thrust tube swing arc.

Figure 24R:
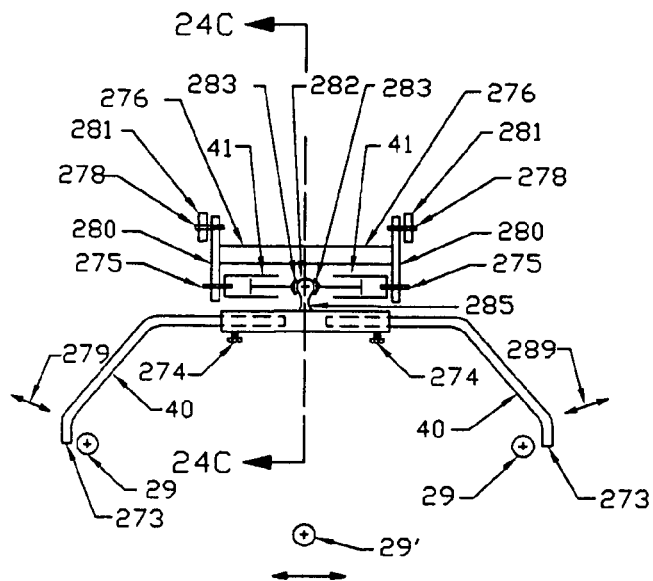
FIGS. 24R and 24S are rear (R) and side (S) views, respectively, of the stern of a boat illustrating the arcuate pivot and mounting details of the steering linkage bar and steering rams.
Figure 24S:
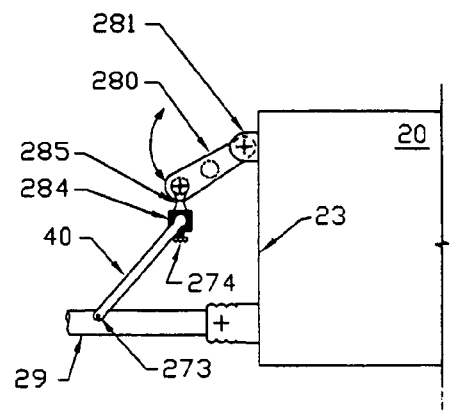
Figure 24C:
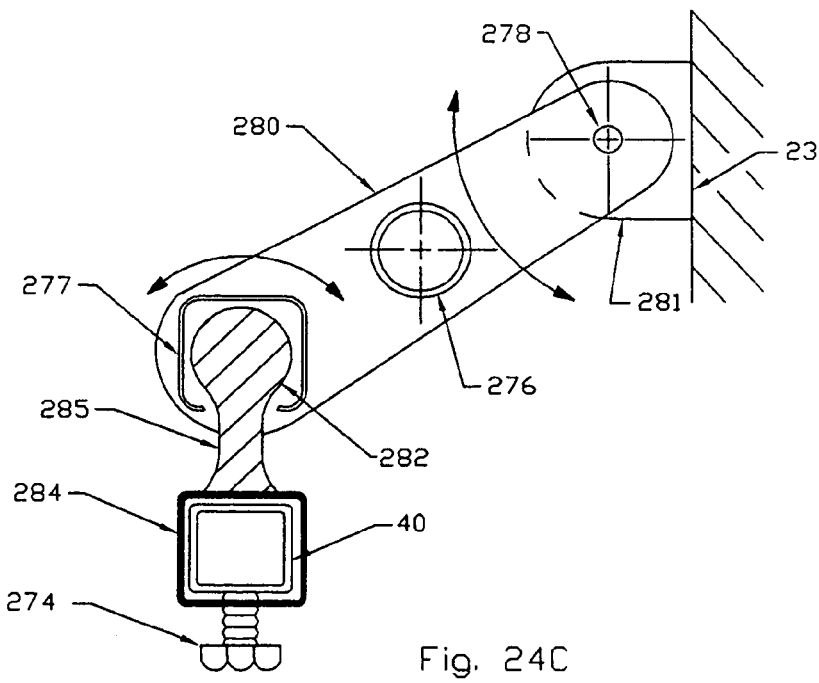
FIG. 24(C) is an enlarged section view of the steering linkage.

A "tie bar" and combination steering link bar 40 serves as a connecting link between the two surface drives 22 and is controlled by two opposing hydraulic steering rams 41. The steering link bar 40 is adjustable in length to set the relative drive positions for parallelism. The combination of closely controlled bite and the use of the steering link bar 40 operates to minimize side crawl of the surfacing propeller 27 and substantially reduces sporadic side forces. These steering rams 41 also float vertically and arcuately from a hinged bracket mounted to the transom 23, as shown in FIGS. 24R, 24S, and 24C.

A characteristic of surface drives is that they tend to crawl sideways due to having only the lower half of the propeller in the water, which thus imparts a net sideways force on the propeller. Twin surface drives are configured to rotate in opposite directions, so that the side forces tend to cancel and the boat 20 does not crawl to the side. However, under normal conditions, such as wave action, boat bounce, cornering, and speed changes, one propeller can dig into the water deeper than its twin and therefore cause the boat to momentarily crawl sideways. This side motion can be chronic, unpredictable, and fatiguing to the driver. It is desirable to eliminate this inherent side force for ease of driving and to minimize driver fatigue, mechanical wear, and inherent instability. On dual engine, dual drive applications with opposite rotation propellers, the side forces are somewhat effectively offset by the use of a tie bar between the two thrust tubes. However, this is effective only if both drives are simultaneously creating equal and opposite forces at every instant and during any and all operating conditions. Such equal and opposite forces canceling each other rarely happens, however, and results in sporadic net side forces. The present invention contemplates the addition of bias fins 60 as illustrated in FIG. 15, which further reduce the sporadic side forces at the drive where they occur. It is noted, however, that the bias fins 60 do add drag forces, which may not be acceptable in certain limited circumstances, such as under racing conditions.

FIGS. 1T and 1S shows a pair of trim tabs 21 each having multiple fluid ejection holes or ports 50 drilled through from the top to the undersurface. Any type of gas, such as air or the like, is ejected from the fluid ejection ports 50 to form a sheet of bubbles to modify or detach the boundary layer of water flow (arrow 24) rushing below the trim tabs 21. The fluid ejection ports 50 are holes from the top surface 102 to the bottom surface 101 of the trim tabs 21 and are angled backwards from the vertical so that the velocity pressure does not force water up into the ports 50. In the embodiment shown, the ports 50 form two rows on staggered centers to provide full coverage without compromising the structural integrity of the trim tabs 21. A fluid distribution manifold or the like (not shown) connects the ports 50 to a source of air through desired regulation control valves (not shown) to control when and the extent of boundary layer modification or separation of the trim tabs 21. It may be desirable to connect the control valve to a source of pressurized air, such as from a supercharger or pressurized exhaust gas from the engine manifold, to ensure a sufficient quantity of gas bubbles for boundary layer separation at high speeds and only when desired. The ports 50 may be grouped to direct the gas to areas most affected during turns or other maneuvers. The same components of ports 50 may be alternately used to eject water or a polymer and water mixture. Ejecting water will usually cause the boundary layer to change from turbulent to laminar flow and thereby change the lift and drag characteristics of the trim tabs. The process of ejecting a polymer, such as Polyox, and water mixture tends to reduce the drag forces.

Figures 1B, 1C:
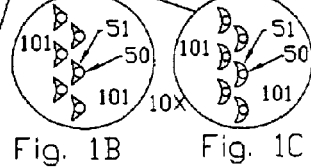
FIGS. 1B and 1C are blow up diagrams illustrating an enlarged view of the underside of the present trim tabs including two different configurations for the diffusers of the fluid ejection ports.

FIGS. 1B and 1C are blow up diagrams illustrating enlarged views of the ports 50 from the underside of either of the trim tabs 21. In the configurations shown, each port 50 has a diffuser 51 on the underside of the trim tab 21 to help distribute the fluid as a thin film rather than a separate string of bubbles or liquid. The diffuser may be in the shape of a crescent as shown in FIG. 1C or a blunt arrowhead as shown in FIG. 1B pointing upstream into the direction of the approaching water illustrated by arrow 24. The flow streamlines from the side edges of the diffusers "overlap" with each other to ensure complete coverage of the fluid at the boundary layer on the undersurface 101 of the trim tab 21. The forward edge of the diffuser is a stepped recess into the undersurface 101 of the trim tab 21 and the rearward edge of the diffuser is feathered to gradually blend in with the bottom surface 101 of the trim tab.

FIGS. 1T and 1S illustrate an exemplary complete power system including a motor 55 having a drive end with a marine transmission 57 facing the bow of the boat 20. The marine transmission 57 feeds power to a "V drive" gearbox 56, which in turn feeds power to a corresponding surface drive 22 and propeller 27. In this drive arrangement, there are several advantages of using a V drive gearbox 56, such as, for example, those manufactured by Casale Manufacturing Company. The gear box is very accessible for gear changing and is not subject to water leakage as are prior art gearboxes mounted external to the boat. Also, it has changeable gear sets with ratios in increments of every few percentage points ranging from approximately 0.75 to 1, up to approximately 1.4 to 1. The center of gravity of the boat is easily changed by sliding the motor 55 rearward or forward without changing the location of the gearbox 56 or the surface drive propulsion system. In the use of pleasure craft, there is a desire for forward, neutral, and reverse operation of the boat and this can easily be accomplished by mounting a marine transmission 57 to the output shaft of the motor. An exemplary marine transmission 57 is the Borg-Warner, Velvet Drive, although other types of transmissions are contemplated. In racing applications, where weight is a premium and rules may dictate certain requirements, the transmission 57 may be replaced with a simple "in" or "out" of gear type of V drive gearbox 56 and a one way sprague clutch (not shown) on the propeller shaft to prevent propeller lock up if any of the drive components seize up.

FIG. 1T shows a top view of the trim tabs 21 illustrating a tapered width along opposite sides 117, 119. In particular, each trim tab 21 is wider at its forward end 121 where attached to the stern of the boat 20 and is tapered to a narrower rearward end 123. A tapered width is beneficial to prevent the trim tabs 21 from snagging on the sheet of water (illustrated by arrow 24) departing from the boat bottom at the stern of the boat 20 during turns. A tapered width also contributes to the regressive flexural stiffness of the tab. The taper is not limited to any particular shape, and may be a linear or nonlinear taper.

Figure 2T:
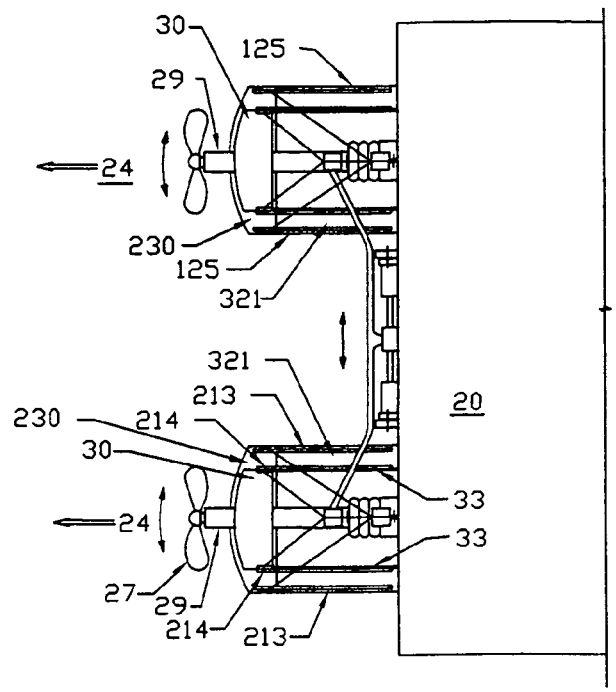
FIGS. 2S, 2R, 2T are side (S), rear (R), and top (T) views, respectively, illustrating a configuration similar to that shown in FIGS. 1S, 1R, and 1T using a straight sided trim tab. Also illustrated are means to limit flooding of the propeller.
Figure 2R:
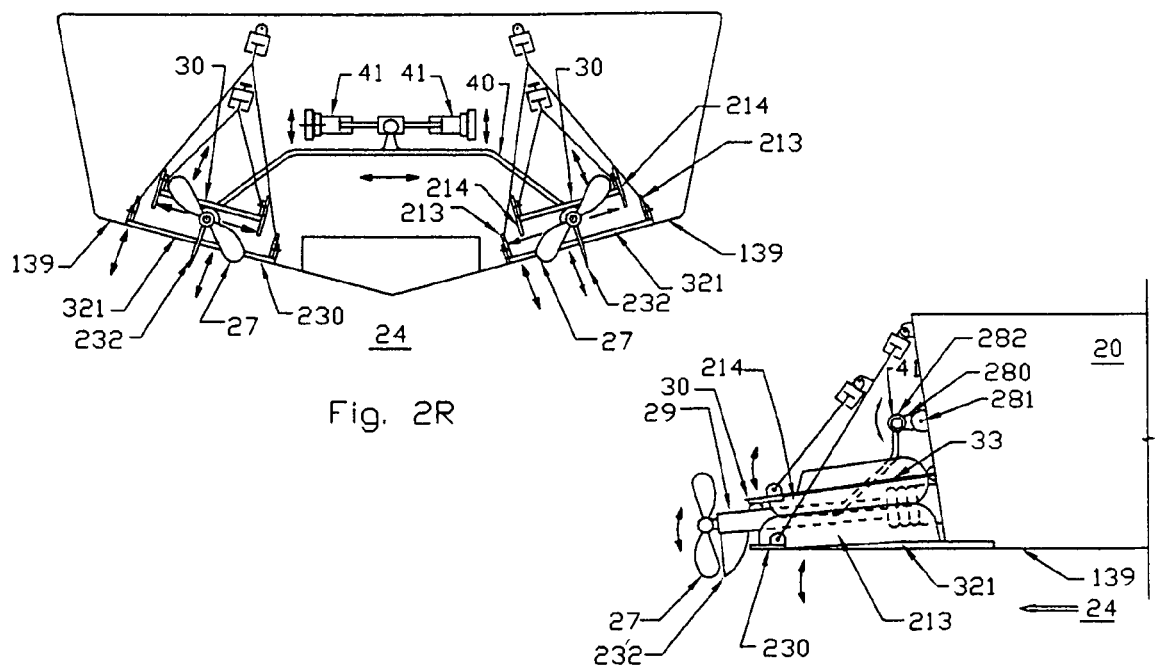
Figure 2S:
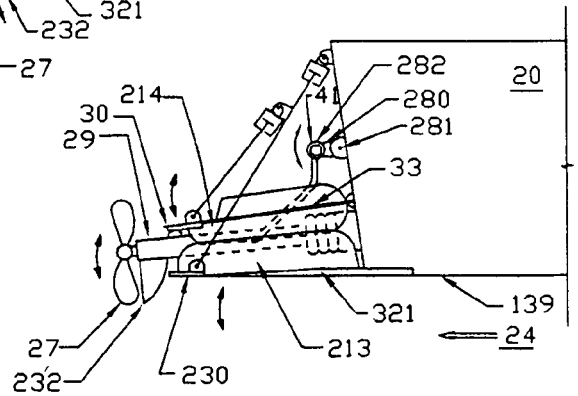

FIGS. 2S, 2R, and 2T illustrate a configuration that is similar to the configuration illustrated in FIGS. 1S, 1R, and 1T, except including generally parallel-sided trim tabs 321 that are particularly suited for straight ahead, high speed operation. In particular, the side edges 125 of the trim tabs 321 are generally straight and parallel with each other. A flood wall 213 made of a light weight material, for example 16 gauge aluminum, or the like, is affixed near each edge 125 of trim tab 321 to project upwards from the upper surface of the trim tab 321. These flood walls 213 limit the flooding of the propeller 27 during low speed operation and takeoff when water tends to wash in over the sides 125 of trim tab 321. Similar flood skirts 214 are affixed to the bite bar arms 33 and project vertically downward to further limit "flooding" of the propeller 27. These flood walls and flood skirts can be installed on any other tabs. In this configuration, an optional skeg 232 may be provided, which is affixed to the thrust tube 29 directly in front of the propeller 27 and behind the rearward edge of the trim tab 321. The skeg 232 has a tapered leading edge that is sloped rearward and downward and is immersed in the water during operation to shed impacting debris to protect the propeller 27.

Figure 3R:
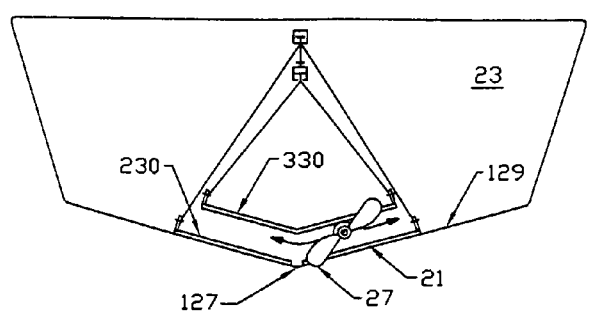
FIGS. 3R and 3S are rear (R) and side (S) views, respectively, illustrating the stern of a V-hull boat with a single surface drive.
Figure 3S:
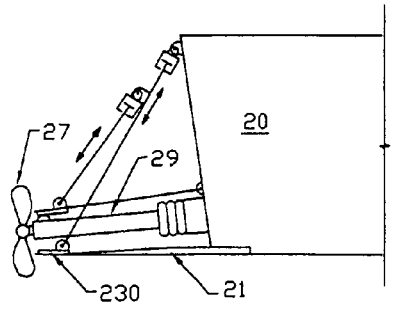

FIGS. 3R and 3S are rear (R) and side (S) views, respectively, illustrating the stern of a V-hull boat 20 with a single surface drive that is mounted above the center line 127 of the V-hull 129, yet which can be swung to either side of the center line 127 to cause the boat 20 to be steered as desired. Note that a bite bar 330 replaces straight configured bite bar 30, where the bite bar 330 includes a "V" configuration to cause the thrust tube 29 and propeller 27 to track the two planes of the trim tab 21.

Figure 4:
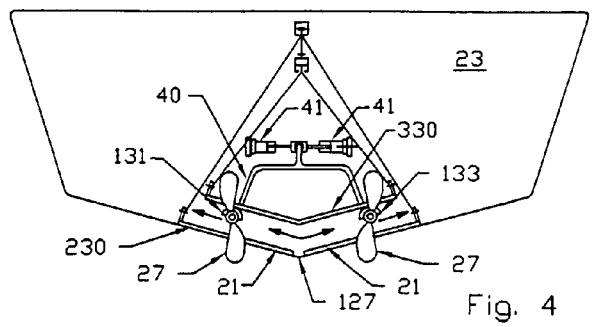
FIG. 4 illustrates present combined invention for a dual-drive surfacing system on a V-hull boat with the drives spaced closely together to minimize yaw.

FIG. 4 is a rear view of a V-hull boat 20 with a pair of surface drives 131, 133 disposed near the centerline 127 of the boat 20 as is sometimes desirable to minimize the yaw effect of unequal thrust forces displaced off the centerline. The present invention allows the left side drive 131 to swing across to the right side of the centerline 127, and further allows the right side drive 133 to swing across to the left side of the centerline 127, to facilitate sharper turns. This crossover capability is facilitated by the use of the bite bar 330 which defines the vertical location of either or both thrust tubes 29, hence the propellers 27 irrespective of their horizontal location. The horizontal position of the left side drive 131 and the right side drive 133 is determined by the steering link bar 40 which is pushed left or right by opposing steering rams 41.

The surface drive of FIGS. 1, 2, 3, 4, 15, 16, and 17 is basically an extended arm type and allows vertical and horizontal deflection at an gimbal 48.

Figure 5R:
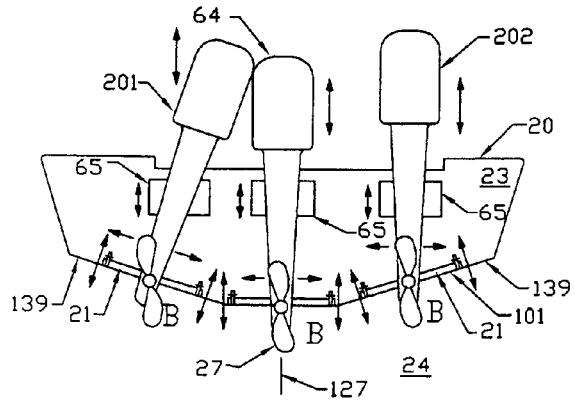
FIGS. 5R and 5S are rear (R) and side (S) views, respectively, illustrating trim tabs according to the present invention fitted to a boat with an outboard motor with jackplate adjustment for operating in a surface piercing mode.
Figure 5S:
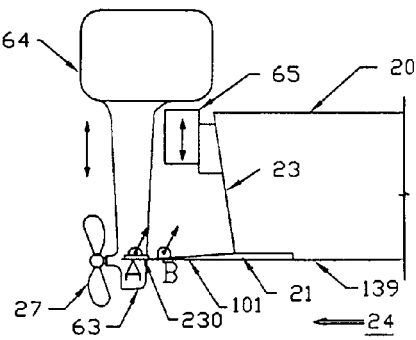

FIGS. 5S and 5R are side (S) and rear (R) views, respectively, of the stern of the boat 20 with an outboard motor 64 and trim tabs 21 in accordance with an embodiment of the present invention. A jackplate 65 is mounted to the transom 23, and the outboard motor 64 is mounted to the jackplate 65. The jackplate 65 is moved up or down independently of the trim tabs 21 to correspondingly vertically position the outboard motor 64 to change the bite of propeller 27. Vertical movement is generally defined as movement that is parallel to a longitudinal vertical plane of symmetry that runs along the centerline of the boat from bow to stern. Adjustment of the trim tab 21 allows the attitude of the boat 20 to be controlled without changing the thrust vector of the propeller 27. This is different from prior art configurations whereby the attitude of the boat 20 was changed by tilting the outboard motor on the transom 23, hence tilting the thrust vector.

Trim tabs A and B can be used separately or together. Trim tab A and trim tab B are similar except trim tab B is shorter than trim tab A. Often, an ordinary outboard jackplate 65 is short and carries the motor fairly close to the transom 23. This close mounting of the motor to the transom leaves only a short distance for a trim tab B to be mounted between the motor drive mechanism and the transom. The effectiveness of a short trim tab B is somewhat limited by its short length and therefore, an arrangement using a long trim tab A only may be most suitable. Trim tab A is mounted in pairs and located off to the sides of the propeller mechanism and may even extend farther rearward beyond the rearward portion of the propeller 27.

In outboard racing applications, the jackplate 65 is often quite long and sets the motor 64 considerably far back from the transom 23 and the effects of boat bounce and cornering have greater effect on propeller bite due to this greater setback. A configuration of trim tab B is more suitable for controlling bite of propeller 27 because there is now sufficient length to enable an elongated version of trim tab B to function as an effective hydrodynamic surface. This single center located trim tab B may be sufficient to control the boat attitude and thus obviate the need for the side mounted trim tabs A and their concomitant added drag forces.

A boat using an outboard motor in a nonsurfacing mode of operation benefits from present invention trim tabs as illustrated in either the A configuration or the B configuration because the propeller thrust can be set horizontal and the attitude of the boat adjusted via the trim tabs to optimize the hull planing angle.

A boat using an outboard motor in a surfacing, or partially surfacing mode of operation benefits particularly from present invention trim tabs because the outboard motor now lacks effective means to change the hull planing attitude.

If the skeg is removed, the outboard motor 64 may accommodate a longer trim tab which reaches fully under the foot portion 63 of the outboard motor 64 giving the full benefit of the surface drives as shown in FIGS. 1, 2, 3, and 4. If the skeg is removed from the foot 63 of the outboard motor, the foot will appear generally like the foot 68 of the I/O 66 as shown in FIG. 6S. Actually, the thrust tube 29 of the surface drive 22, and the foot portion 63 of the outboard motor 64, and the foot 68 of the I/O 66 all serve the same function and can be referred to, in general, as a "propeller shaft carrier".

Any surfacing propeller causes side crawl and the resultant yaw effect. A single outboard motor is no exception. This situation can be resolved by using the bias fins 60. The advantage of operating the outboard motor in a surfacing condition is the reduction of the drag forces and the resultant increase in speed. Outboard motors are often operated in the surfacing mode for racing applications.

In any of the outboard motor applications, the trim tab adjust can be connected to a servo lever (not shown) and servo switch (not shown) such that a change in the position of the trim tab 21 causes a corresponding change in the vertical position of the jackplate 65 and thus maintain a constant bite of the propeller 27. The vertical adjustment of the jackplate 65 may be operated independently of the trim tabs 21 to change the bite of the propeller to optimize the performance of the motor.

It is contemplated that present invention is suitable for both single and multiple outboard motor applications.

Dual outboard motors, comprised of a left side motor 201 and a right side motor 202, are mounted to the boat. It is noted, as shown in FIG. 5R, that the right side motor 202 is mounted in the usual vertical fashion. If the boat 20 is a V hull or a catamaran or otherwise has a sloped bottom, the propeller 27 of the right side outboard motor 202 as viewed in FIG. 5R, will bite excessively into the departing sheet of water (arrow 24) as the motor is turned out, and conversely the propeller will decrease its bite as the motor is turned in. It is noted that the left side motor 201 is mounted in a novel fashion in that the motor 201 leans in at the top, and leans out at the bottom as viewed in FIG. 5R. Thus, the motor 201 is mounted with considerable "camber". Again, if the boat 20 is a V hull or catamaran or otherwise has a sloped bottom, and the motor 201 is mounted with sufficient camber, that is to say the top of the motor is tilted in towards the centerline 127 of the boat, then the left and right swing of the propeller shaft carrier, hence the propeller 27, describes a plane which is generally parallel to and coextensive with the undersurface 101 of the trim tab 21 and with the surface of the departing sheet of water (arrow 24). This novel mounting arrangement eliminates variations in bite as a function of left or right steering motions. In a particular configuration, both motors are cambered or both are vertical. Note however, the jackplate 65 allows for true vertical motions of the outboard motors 201 and 202. Also, the amount of camber may be adjusted to result in a slight amount of skew of the propeller bite. Note, using the standard "tilt" function, as found on most outboard motors, will cause the amount of "toe in" to change, often with undesirable results, and should be reserved for "beaching" the boat.

Steering is accomplished by a steering link (not shown) and steering rams (not shown) which are similar to the steering link bar 40 and the steering ram 41, respectively, as shown in FIG. 1.

Figure 6R:
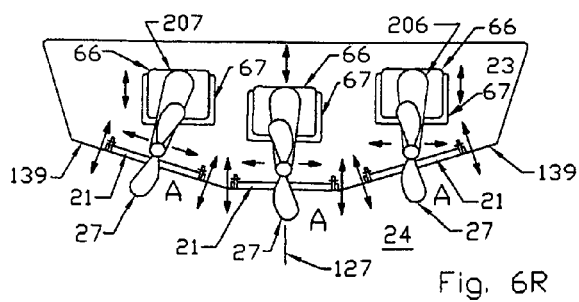
FIGS. 6R and 6S are rear (R) and side (S) views, respectively, illustrating trim tabs according to the present invention fitted to a boat with an inboard/outboard or stern drive with a vertically jackable adjustment for operating in a surface piercing mode.
Figure 6S:
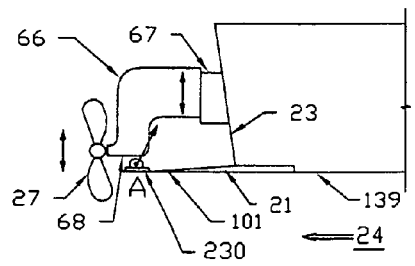

FIGS. 6S and 6R are side (S) and rear (R) views, respectively, of the outdrive portion of inboard/outboard (I/O) propulsion systems. Because outboard motors and I/O's have similar geometry and operating characteristics, the present invention also applies to I/O's. The I/O 66 may be mounted on jackboxes 67 similar in function to the jackplates 65 used for outboard motors to increase the distance between the propeller 27 and the transom 23 and to allow some vertical travel of the I/O 66. Vertical movement is generally defined as movement that is parallel to a longitudinal vertical plane of symmetry that runs along the centerline of the boat from bow to stern. Because the drive and propeller portion of an I/O is virtually identical in form and function to an outboard motor lower unit, the benefits of present invention are equally applicable to an I/O propulsion system. FIG. 6S illustrates an outdrive without a skeg which is similar to the operation of a skegless outboard motor as discussed in FIG. 5. It is contemplated that the I/O 66 can be operated as a full immersion propeller drive using present invention trim tabs alone and that the propeller shaft carrier portion of the outdrive may, or may not, have a skeg. Moreover, it is also contemplated that the I/O can be operated as a surfacing drive with prior art or present invention trim tabs located immediately in front of and below the propeller and thereby improve the performance of the boat and the drive system. However, as stated before, the surfacing mode of the propeller will result in the side crawl of the boat and may require the addition of the bias fins 60 (not shown) of FIG. 15.

The operation of the trim tabs A is used to adjust the attitude of the boat. A servo lever and servo valve (not shown) causes the I/O 66 to be moved truly vertical on the jackbox 67 in response to a similar movement of the rearward edge of the trim tab 21. Thus, an adjustment of the trim tab 21 causes, in turn, a similar vertical adjustment of the I/O 66 to maintain the same amount of propeller bite. However, the bite of the propeller 27 can be changed independently of the trim tab adjustment to thus optimize the performance of the motor.

It is contemplated that present invention is suitable for use on both single and multiple I/O applications. It is also contemplated that the standard vertical mounting, as shown by outdrive 206 on the right side of FIG. 6R, of dual I/O's on a V hull or catamaran causes variable bite of the propeller 27 into the sheet of water (arrow 24) exiting out from the undersurface 101 of the trim tab 21. This variable bite is the result of outdrive 206 being mounted in the usual generally vertical fashion and the trim tab being mounted in the usual fashion flush with the bottom of the boat. As outdrive 206 is swung to the outside, the propeller digs into the angled sheet of water (arrow 24) and causes excessive bite. Conversely, if the outdrive is swung to the inside, the propeller pulls out of the angled sheet of water (arrow 24) and causes a decrease of its bite. Therefore, it is disclosed that each I/O should be cambered at an angle on the transom 23, as shown by outdrive 207 on the left side of FIG. 6R, such that the left and right steering motion of the propeller shaft carrier, hence propeller 27, describes a plane which is generally parallel to and coextensive with of the undersurface 101 of the trim tab 21 and the departing sheet of water (arrow 24). In a particular configuration, both outdrives are cambered or both are vertical. Note however, the jackbox 67 is mounted to allow for true vertical motions of the I/O 207 and 206. Also, the amount of camber may be adjusted in or out to result in a slight amount of skew of the propeller bite as disclosed in FIG. 1. Note, using the standard "tilt" function, as found on most I/O units, will cause the amount of "toe in" to change, often with undesirable results, and should be reserved for "beaching" the boat.

Steering is accomplished by a steering link (not shown) and steering rams (not shown) which are similar to the steering link bar 40 and the steering ram 41, respectively, as shown in FIG. 1.

FIGS. 7U, 7N, and 7D show prior art hinged trim tabs 135 in the up (U), neutral (N), and down (D) positions, respectively. The deflections illustrated are exaggerated versions of the normal operating deflections. FIGS. 8U, 8N, and 8D show prior art bending flat plate trim tabs 137 in the up (U), neutral (N), and down (D) positions, respectively. Again, deflections are exaggerated. FIGS. 9U, 9N, and 9D illustrate an exemplary embodiment of regressive flexural stiffness trim tabs 21 in the up (U), neutral (N), and down (D) positions, respectively. Again, deflections are exaggerated. The cross hatched areas illustrated are the hull bottom 139 and transom 23 of the boat 20. In each configuration, at least one bracket 141, typically a pair of brackets 141, are provided at or near the rearward edge 107 of the trim tabs 21 for attachment of the trim yoke 26 to enable the trim tab 21 to be flexed up and down. An up arrow 143 indicates an upward force applied to the brackets 141 and a downward arrow 145 indicates a downward force applied to the brackets 141. Brackets 141 are affixed to trim bar 230, which is affixed to the upper surface of the trim tab 21.

FIGS. 10 through 14 each include rear (R) and side (S) views of several trim tabs 21 in accordance with various embodiments of the present invention. Each trim tab 21 configuration generally comprises a plate having a generally regressive second moment of inertia from the forward end 121 to the rearward end 123. When flexed up or down in this manner, each trim tab 21 configuration has the characteristic in that the bottom surface 101 is deflected in a progressive curve from the forward end 121 to the rearward end 123 during operating conditions, that is, while the boat 20 is moving across the surface of water so that water (arrow 24) is flowing across the bottom surface 101 of the trim tab 21. Although the height of these tapers appear to be linear, they are not limited to such since actual operational deflection requirements may dictate something different.

Figure 10R:
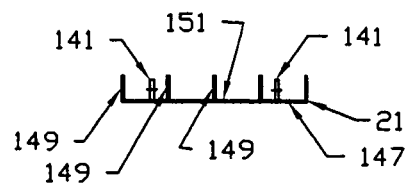
FIGS. 10 through 14 each include rear (R) and side (S) views of trim tabs in accordance with various embodiments of the present invention, including ribbed trim tabs, corrugated trim tabs, regressively tapered trim tabs, laminated trim tabs, and tapered ribbed trim tabs, respectively.
Figure 10S:
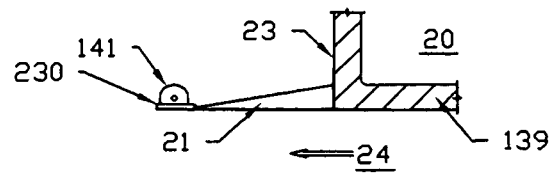

FIGS. 10R and 10S are rear (R) and side (S) views, respectively, of a ribbed trim tab 21 with several ribbed spines 149. The ribbed trim tab 21 includes a generally flat plate 147 with the ribbed spines 149 extending upwards from a top surface 151 of the plate 147 as shown in FIG. 10R. The ribbed spines 149 may be integrally formed to the plate 147 or otherwise mounted to the plate 147 in any suitable fashion. Each ribbed spine 149 has been cut to a taper so that it is taller at the forward end 121 of the trim tab 21 and is progressively shorter towards the rearward end 123. The plate 147 and the ribbed spines 149 may be made of a suitable material, such as aluminum or the like.

Figure 11R:
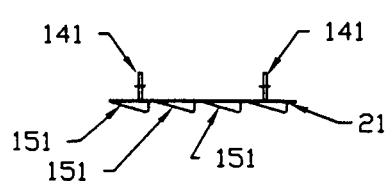
Figure 11S:
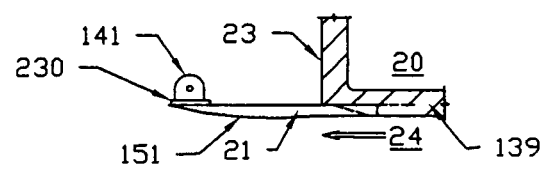

FIGS. 11R and 11S are rear (R) and side (S) views, respectively, of a corrugated trim tab 21 in accordance with another embodiment including a generally flat sheet of stainless steel or the like which has been corrugated lengthwise to match the strakes of the bottom of the boat 20. In particular, the corrugated trim tab 21 includes generally tapered corrugations 151 along the bottom surface of the otherwise flat sheet in which each tapered corrugation 151 is deeper at the forward end 121 and is progressively shallower towards the rearward end 123 of the trim tab 21. The corrugations align with and form coextensions of the strakes where formed on the hull bottom 139.

Figure 12R:
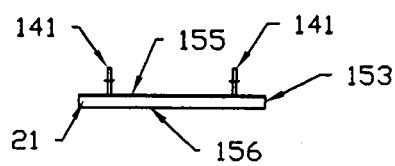
Figure 12S:
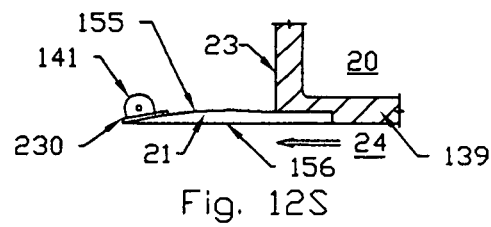

FIGS. 12R and 12S are rear (R) and side (S) views, respectively, of a regressively tapered trim tab 21 in accordance with another embodiment including a generally flat and resilient sheet 153 of material which has been formed or machined with a regressive taper from the forward end 121 to the rearward end 123 of the trim tab 21. In this case, the upper or top surface 155 of the sheet 153 is tapered and the lower surface 156 remains generally flat in the neutral position.

Figure 13R:
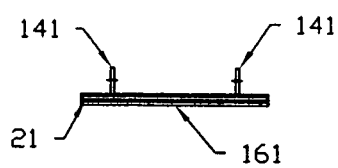
Figure 13S:
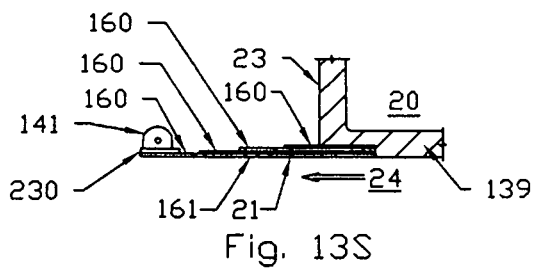

FIGS. 13R and 13S are rear (R) and side (S) views, respectively, of a laminated trim tab 21 in accordance with another embodiment comprised of multiple layers of resilient material similar in configuration to an automobile suspension leaf spring. In particular, a stack of relatively thin sheets 160 of material of progressively longer length from top to bottom are formed or otherwise mounted together to form the laminated trim tab 21. The laminated trim tab 21 performs much like a leaf spring. In this case, the upper surface is stepped downward from the forward end 121 to the rearward end 123 using progressively longer thin sheets 160 to form a trim tab 21 of regressive flexural stiffness. The lower surface 161 remains generally flat in the neutral position.

Figure 14R:
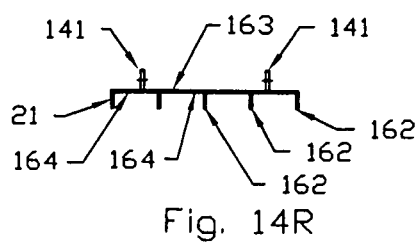
Figure 14S:
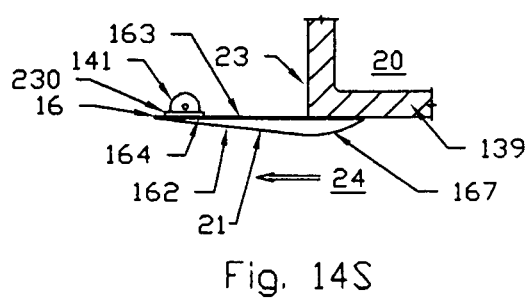

FIGS. 14R and 14S are rear (R) and side (S) views, respectively, of a tapered ribbed trim tab 21 with several ribbed spines 162. The tapered ribbed trim tab 21 includes a generally flat plate 163 with the ribbed spines 162 extending downwards from a lower surface 164 of a generally flat plate 163. Each ribbed spine 162 been cut, or is otherwise formed with a tapered height and installed facing downwards to act like stiffening ribs. Each ribbed spine 162 has a streamlined leading edge 167.

Any of the trim plate 21 configurations may be employed on any boat 20 of any configuration to improve operation as described herein. The present invention further contemplates the use of any of the trim tab 21 configurations or existing or prior art trim tab configurations in cooperation with surfacing propellers as described herein. For example, the present invention contemplates positioning the trim tabs 21 in line with, directly in front of, and sufficiently close to the surfacing propeller 27 of a surface drive boat to minimize variations in propeller blade immersion of the surfacing propeller 27 under operating conditions. The present invention further contemplates positioning existing or prior art trim tab configurations in line with, directly in front of, and sufficiently close to the surfacing propeller 27 of a surface drive boat to minimize variations in propeller blade immersion of the surfacing propeller 27 under operating conditions.

FIGS. 15R, 15S, and 15T are rear (R), side (S), and top (T) views, respectively, of a surface drive system in another exemplary embodiment showing bias fins 60 for the correction of side crawl effects. For the sake of clarity, FIG. 15T does not show the usual bite bar 30 or bite bar yoke 32, which would occlude present detail bias fins 60 which are affixed to fin mounting plate 61, which, in turn, is affixed to thrust tube 29. The bias fins 60 are located on each side of the propeller 27 at a location behind the rearward edge 107 of trim tab 21. Each bias fin 60 has a leading edge 62 that is curved rearward and downward to shed impacting debris. Each bias fin 60 has a side area which is proportional to the swept area of the propeller 27 as it is similarly immersed in the water (arrow 24). These bias fins 60 are rotatably adjustable about a plane perpendicular to the bias fin plate 61 to impose a hydrodynamic side force to the thrust tube 29. A similar embodiment is effected when the bias fins 60 and the bias fin plate 61 are rotated as a combined unit on the thrust tube 29 about an axis vertical to the departing sheet of water (arrow 24) from the undersurface of the trim tab 21. Alternatively, a single bias fin (not shown) may be located on either side of the propeller 27 and adjusted at a steeper bias angle, or made larger in size, as necessary to offset the side crawl forces of the propeller 27. The bias fins 60 are suitable for all types of surface drives, including extended arm types (FIGS. 1, 2, 3, and 4), outboard motor types (FIG. 5), and inboard/outboard or outdrive types (FIG. 6).

Despite the clear advantages of trim tabs in accordance with the present invention to minimize the sporadic changes in the thrust forces, and the side forces of surface drives in general, there still remain undesirable and unavoidable side forces due to the propeller side crawl. Advantageously, when surface drives are mounted in pairs with opposite rotation, and used with the trim tab configurations described herein, most of the side forces are answered by a nearly equal and opposite forces from the sister drive. However, the side forces due to the propeller side crawl are still present. The addition of bias fins 60 simultaneously cancels the propeller side force with a corresponding hydrodynamic force and contains them to that particular outdrive. As the propeller 27 plunges deeper into the water, so too, does the bias fin 60, thus increasing the counter force. The faster the propeller 27 spins, so too, the faster the boat travels, and so too, the stronger the bias fin 60 tends to counteract the side crawl. The bias fins 60 cause an instantaneous, counterbalancing hydrodynamic force. The use of the bias fins 60 improves single drive operation by nullifying nearly all the side forces at that drive as they occur. Unfortunately, despite the improvement in control by the addition of these bias fins, there is an added drag force penalty due to the bias fin 60 being pulled through the water (arrow 24).

Figure 16:
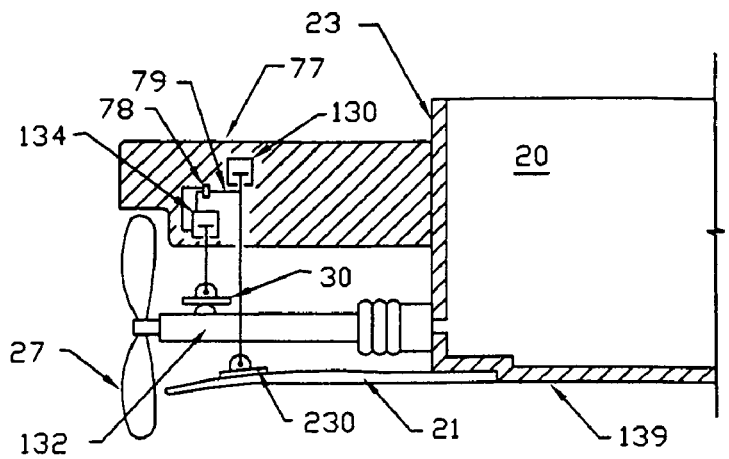
FIG. 16 is a side view of the stern of a boat illustrating a combined surface drive and trim tab configuration integrated into a swim platform hull extension.

FIG. 16 is a side view of the stern of the boat 20 with the trim tabs 21 and trim tab actuators 130 affixed to a swim platform 77 or other extension of the hull as popular with contemporary boat designs. Located above the trim tabs 21 is a surface drive 132 which is configured to swing left and right for steering and to a lesser degree, up or down for propeller bite. Propeller bite is controlled by separate bite actuators 134 which are affixed to the hull or to a carrier (not shown) which moves with the trim tabs 21. Although the bite actuators 134 may be configured to be independent, it is contemplated that servo valve 78 and servo lever 79 may optionally be added as shown to allow the bite bar 30 to track up and down movements of the trim tab 21. In this configuration, the bite of the surfacing propeller 27 and the deflection of the trim tabs 21 may be independently controlled, or they may be controlled together via operation of the servo valve 78 and a servo lever 79. It is also contemplated to add skew to the trim tab 21 by hydraulically sequencing the trim tab actuators 130. It is also contemplated to add skew to the bite bar 30 by hydraulically sequencing bite actuators 134.

Figure 17:
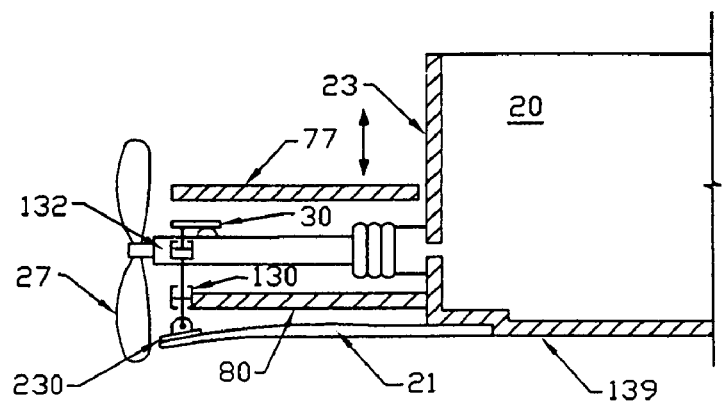
FIG. 17 is a side view of the stern of a boat illustrating a combined surface drive and trim tab configuration integrated with independent cantilevered hull members.

FIG. 17 is a side view of the stern of the boat 20 illustrating another exemplary embodiment in which the hull extension or swim platform 77 is a powered elevator for swimming or recreational convenience as common with luxury yachts. The surface drive 132 is located below the swim platform 77. A pair of rigid extensions 80 of the hull are located parallel to the surface drive 132 and the trim tabs 21 are located below the pair of rigid extensions 80. As before, the bite bar 30 is controlled by actuators 134, which may, or may not, be linked to trim tab actuators 130 in a similar manner as previously discussed. There may be some aesthetic advantages of concealing some of the mechanism, but service and maintenance access may be compromised. It is also contemplated to add skew to the trim tabs 21 by hydraulically sequencing the trim tab actuators 130. It is also contemplated to add skew to the bite bar 30 by hydraulically sequencing bite actuators 134.

Figure 18:
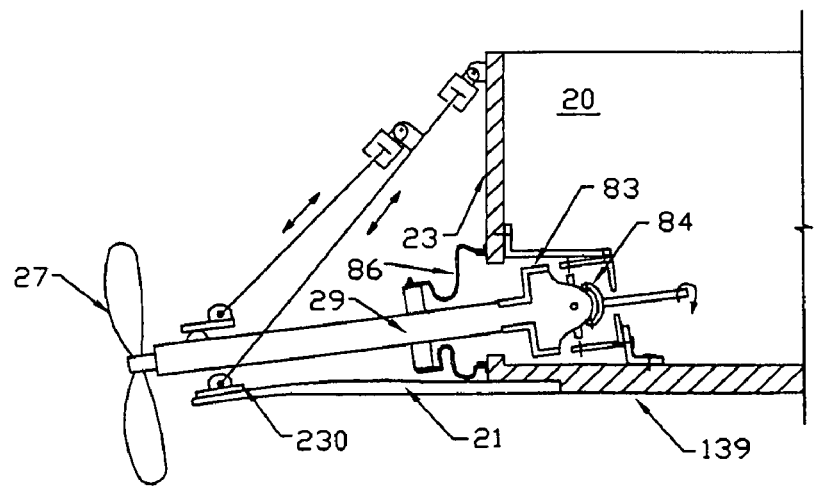
FIG. 18 is a side view of the stern of a boat illustrating a combined surface drive and trim tab configuration in which the gimbal and universal joint are located inside the hull.

FIG. 18 is a side view of the stern of the boat 20 illustrating another exemplary embodiment in which an entire gimbal assembly 83 and inner universal joint 84 is located within the hull of the boat 20. A rubber boot 86 is provided to seal the thrust tube 29 to the transom 23. The advantage of this configuration is that the gimbal assembly 83 and the universal joint 84 can be serviced from within the boat 20 and need not be waterproofed. Another advantage is that the hole in the transom 23 is sufficiently large to allow the rear half of the gimbal assembly 83 and the universal joint 84 to be removed with the thrust tube 29, as a unit, out through the transom 23 for easier service. The disadvantage is that if the rubber boot 86 fails, the stern portion or compartment of the boat 20 may flood.

Figure 19T:
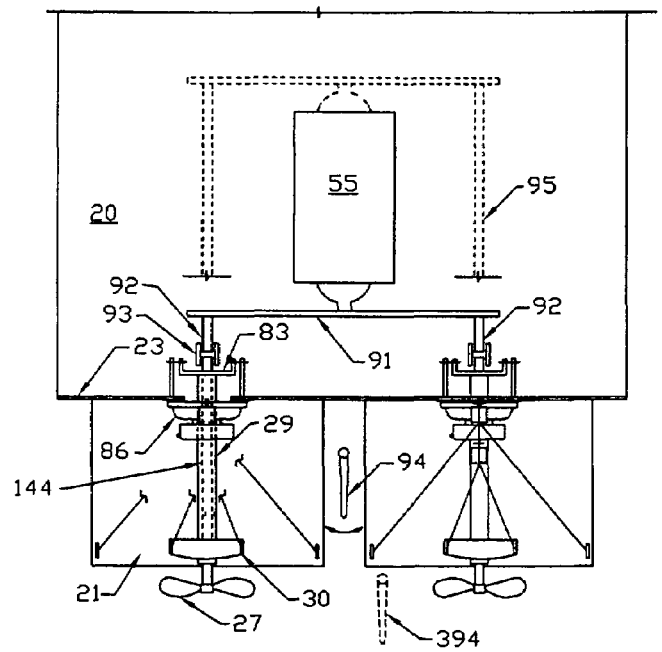
FIGS. 19S, 19R, and 19T are side (S), rear (R), and top (T) views, respectively, illustrating a drag boat which has a single engine feeding power to a transmission which has a single input shaft and two counter rotating output drive shafts.
Figure 19R:
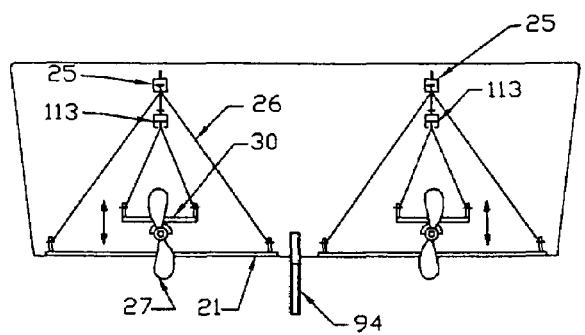
Figure 19S:
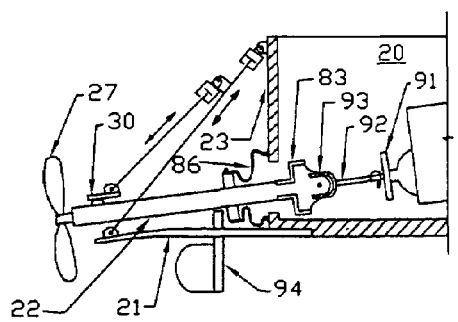

FIGS. 19S, 19R, and 19T are side (S), rear (R), and top (T) views, respectively, illustrating a drag boat 20 which has a single engine 55 feeding power to a transmission 91 which has a single input shaft and two counter rotating output drive shafts 92. Each output drive shaft 92 is connected by a flexible coupling 93 to a propeller shaft 144 of a corresponding surface drive 22. The trim tab 21 and the bite bar 30 are shown and are operator controlled. High speed steering is accomplished by controlling the amount of bite of either propeller 27. For example, in one embodiment, the pair of bite rams 113 are raised or lowered in parallel to control the bite of the pair of surfacing propellers 27 as a means to optimize the engine load. The bite rams 113 may also be controlled to move in opposite directions simultaneously, such as by a steering wheel or the like, to effectuate steering by causing one propeller to bite more than its twin. Low speed steering may be accomplished by a drop down rudder 94 operated by the driver. The rudder 94 may alternatively be located at the rearward edge of the trim tab 21, as illustrated by a dashed line rudder 394, so that the pair of trim tabs 21 may be joined as one thereby eliminating the gap between them. It is also contemplated that the motor 55 may be rotated 180 degrees such that the engine output shaft is facing forward in the boat 20 as illustrated by dashed lines. This later, rotated arrangement requires longer drive shafts 95, but enables the flexible coupling 93 and half gimbal 83 to be located farther forward to minimize the angular deflection of the propeller shafts 144 and thus reduces the stresses on the flexible couplings 93 due to off axis operation. Another advantage for ease of service is that the hole in the transom 23 is sufficiently large to allow the rear half of the gimbal assembly 83 and the flexible coupling 93 to be removed with the thrust tube 29, as a unit, out through the transom 23.

FIGS. 20S, 20R, and 20T, are side (S), rear (R), and top (T) views, respectively, of a people guard 58. The illustrated people guard 58 is retractably attached (e.g., pivotally, hinged, via control arms or levers, etc.) to the bite bar yoke 32 such that at low speed, the spray from the propeller 27 is too weak to lift the people guard 58 away. At high speed, the propeller spray impact causes the people guard 58 to pivot or swing up to a new position illustrated at 358 and out of the way of the spray departing from the blade tips to thus allow the propeller 27 to fully ventilate as necessary for optimum performance. The people guard 58 is constructed of a generally rectangular piece of rigid material, for example, 16 gauge aluminum. The people guard 58 may additionally (or alternatively) operate as a splash plate. The people guard 58 is mounted generally horizontal above the propeller 27 and has a width sufficient to cover the propeller 27 at any point as it is swept left or right as part of the steering motion. The people guard 58 may be made sufficiently long, from front to rear, to cover the propeller 27 at any point as it is swept left or right as part of the steering motion. The people guard 58 is securely affixed to two rigid extensions, for example, 1 inch diameter aluminum tube, referred to as splash plate arms 211, which are hingedly attached to the legs of the bite yoke 32. A tether chain or cable (not shown) connected from the people guard 58 to the bite yoke 32, limits the downward position of the people guard 58 such that it does not contact the propeller 27. A remote control actuator (not shown) may be provided for racing applications to lift or otherwise pivot the people guard up at any operating condition.

Two flood gates 270 are mounted to project vertically up from and along each side of trim tab 21 to limit the flow of water flooding propeller 27 when the boat is attempting to get on plane. These flood gates 270 are secured by flood gate hinges 271 to the transom 23 of boat 20 and swing up to a raised position, by remote control, as shown by 370. These flood gates 270 serve a function similar to flood walls 213, and flood skirts 214, as shown in FIGS. 2S, 2R, and 2T.

Figure 21R:
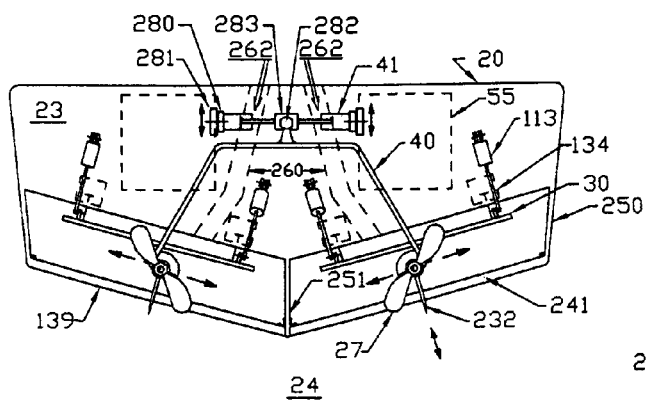
FIGS. 21R and 21S are rear (R) and side (S) views, respectively, of a boat with a rigid trim tab and an air duct for supplying ventilating air to the propeller of a surface drive.
Figure 21S:
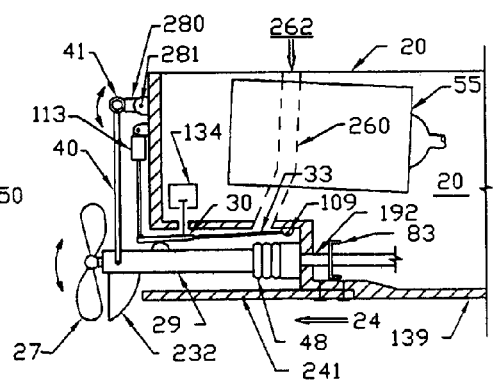

FIGS. 21S and 21R, are side (S), and rear (R) views, respectively, of a stern of a boat 20 which has a trim tab 241 affixed to the bottom 139 of the boat 20. The trim tab is rigid and may, alternatively, be an integral extension of the hull. Bite rams 113, or alternatively, 134, move the bite bar 30 up or down to adjust the bite of the propeller 27 by moving the thrust tube 29 in an up or down motion. The bite bar 30 is attached by bite bar arms 33 to hinges 109 mounted to the boat 20. The gimbal 48, or alternatively 83, allow the left or right and up or down swing of thrust tube 29. Flood walls 250 serve to limit flooding of the propeller 27 and also provide edge support to the trim tab 241. A similar center support septum 251 provides additional support to the trim tab 241. An air duct 260 provides a path for ventilating air, illustrated by arrow 262, to fill the cavity surrounding thrust tube 29. The air duct 260 originates from a location above the water line at a location, which, for example, may be on the top surface of the boat 20, or alternately on the side, or on the stern 23 of the boat 20. Steering is accomplished by steering rams 41 connected to steering link bar 40.

Figure 22R:
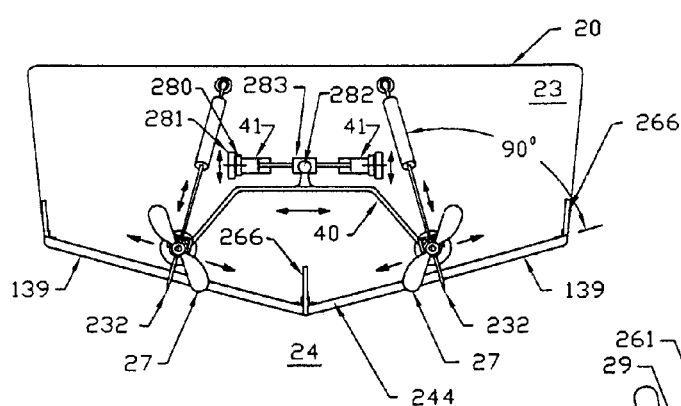
FIGS. 22R and 22S are rear (R) and side (S) views, respectively, of a boat with a rigid trim tab or hull bottom extension combined with a surface drive.
Figure 22S:
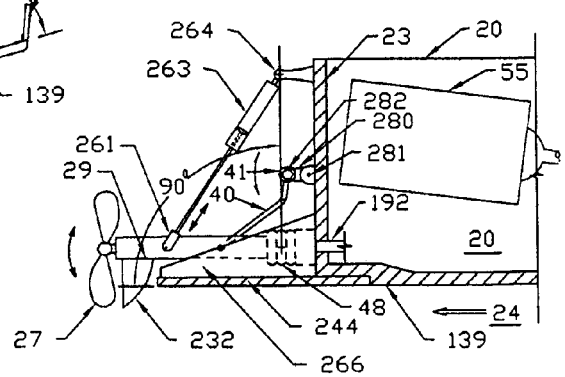

FIGS. 22S and 22R, are side (S), and (R) views, respectively, of a stern of a boat 20 which has a rigid trim tab 244 affixed to the bottom 139 of the boat 20. The rigid trim tab may, alternatively, be an integral extension of the hull. The fixed portion of the gimbal 48 is mounted to the transom 23 at a location close to and above the trim tab 244. The lower end of an extended bite ram 263 is attached to the thrust tube 29 with a clevis connection 261. The upper end of the extended bite ram 263 is attached to the transom 23 by a ball and socket joint 264. A "pin and block universal joint" known in industry is another example of a suitable swivel joint whereby the axis of rotation of the vertical arc of swing crosses the axis of rotation of the horizontal swing of the joint similar to a ball and socket style joint. The ball and socket joint 264 is mounted to the transom 23 at a location such that the center of rotation of the ball and socket joint 264 is generally on a line which is collinear with the line formed by a perpendicular projection from the undersurface of the trim tab 244 through the center point of rotation of the gimbal 48. By establishing this perpendicular geometric relationship between the center of the gimbal 48 and the center of the ball and socket joint 264 and the plane of the undersurface of the trim tab 244, the left and right swing of the propeller 27 maintains a constant bite depth in the water (arrow 24) without adjusting the stroke position of the extended bite ram 263. The upper attachment point of the ball and socket joint 264 is adjustable to the left or right to predispose some skew on the propeller bite as the propeller 27 swings in a left and right steering motion. The depth of bite of the propeller 27 into water (arrow 24) is controlled by extending or retracting the extended bite ram 263. Adjusting the location of the ball and socket joint 264 by moving it rearward from the orthogonal line position will cause propeller 27 to "swoop" down to have greater bite in the middle portion and less bite in the right turn or the left turn position. This "swoop" down effect is visible while looking at the boat from the rear view. Adjusting the location of the ball and socket joint 264 forward from the orthogonal line position has the converse effect on the bite of propeller 27 causing it to "soar" up in the middle portion of the steering motion. This "soar" up effect is visible while looking at the boat from the rear view. Being able to adjust for "swoop" and "soar" is important for fine tuning the amount of propeller bite on boats with bottoms that have two different deadrise angles at the stern. That is to say, the amount of variations in propeller bite can be minimized even on boats that have bottoms that are not a single angle deadrise, but in fact have bottoms that are formed of two distinct angles per side of the centerline.

Designers of existing surface drives have ignored the importance of the orthogonal line location for ball and socket joint 264 and therefore, are known to have severe handling problems associated with large changes in the depth of the propeller bite. These designers have failed to recognize the importance of aligning the control mechanism relative to the bottom operative surface of the boat 139. Surface drive manufacturers rather simply, and incorrectly, instruct and show that the extended bite ram 263 is to be aligned square with the world, and vertical with respect to the horizon. Steering motion is accomplished by steering rams 41 acting on steering linkage bar 40 connected to the thrust tube 29. Vertical brace walls 266 located at the inner and outer edges of the trim tab 244 are affixed to the trim tab 244 on one edge and to the transom 23 on another edge to provide support and minimize flooding of the propeller 27.

Figure 23R:
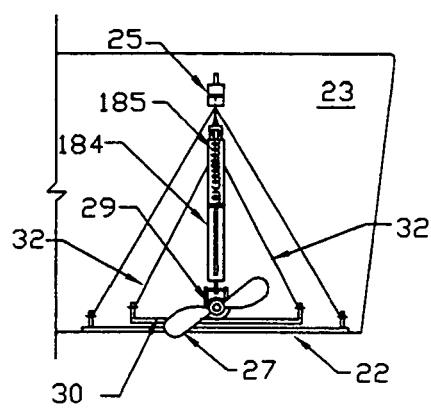
FIGS. 23R and 23S are rear (R) and side (S) views, respectively, of the stern of a boat illustrating a surface drive with the bite bar below the propeller shaft carrier.
Figure 23S:
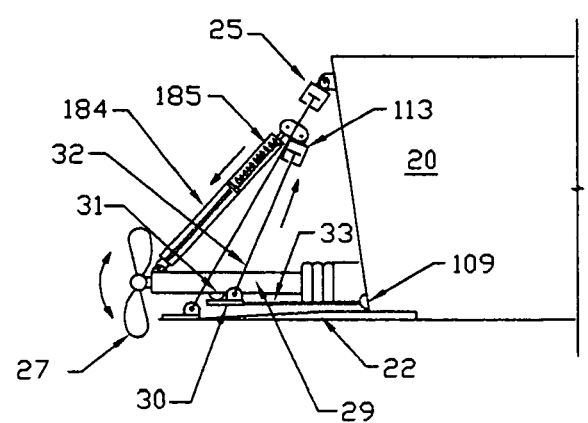

FIG. 23S is a side view of the stern of a boat 20 similar to FIG. 1S. The difference between the two arrangements is that the bite bar 30 can either be used to push down on the thrust tube 29, as illustrated in FIG. 1S, or the bite bar 30 can be used to pull up on the thrust tube 29, as shown in FIG. 23S. In FIG. 1S, it is noted that the bite bar 30 is located above the thrust tube 29 and is used to force the propeller 27 down into the water 24, while at the same time the thrust tube is urged upward by tension spring 183 and cable 182 to pull the thrust tube upward such that the low friction pad 31 rides on the under side of the bite bar 30.

The configuration shown in FIG. 23S is an alternative construction in which the bite bar 30 is located below the thrust tube 29 and the low friction pad 31 is located below the thrust tube and rides on the upper surface of the bite bar. Tension spring 183 is replaced by a compression spring 185, and cable 182 is replaced by extension rod 184. Also, low friction pad 31 is located on the bottom side of thrust tube 29. The bite ram 113 and bite yoke 32 are very similar in either embodiment.

The advantage of the configuration shown in FIG. 23S is that it is more forgiving of propeller strikes on submerged objects. Because thrust tube 29 is located below bite bar 30, thrust tube 29 can freely recoil upward against the force of a simple spring and no damage occurs. In contrast, a propeller strike employing the configuration shown in FIG. 1S may cause the thrust tube 29 to recoil upward against a substantial amount of rigid hardware, which may ruin bite bar 30, bite yoke 32, bite ram 113, and other attachments.

FIG. 24S and FIG. 24R are partial side (S) and rear (R) views, respectively, of a dual surface drive system mounted to stern of a boat 20 with particular attention to the detail of the tie bar 40 and steering rams 41 as part of the steering system. FIG. 24C is a vertical section view through the center plane of the steering mechanism and is shown as an enlarged version to clarify some details. This steering system is shown in abbreviated form in FIG. 1, FIG. 2, FIG. 21, and FIG. 22.

The tie bar 40 has swivel ends 273 where it is attached to the thrust tube 29. Swivel ends 273 attach tie bar 40 to thrust tube 29 to move the thrust tube in a left and right sweeping motion as part of the steering function. The swivel ends allow rotary motion about any axis and may be configured as simple ball joint rod ends that are common to industry.

Arrow 279 and arrow 289 show the paths of the thrust tubes as they follow the sloped bite bar 30 (not shown) on the left side of the boat and on the right side of the boat, respectively. It is noted that the right and left tie bar 40 thus have equal and opposite vertical components to its respective side to side motion. That is to say, when the left side thrust tube 29 follows up arrow 279, the right side thrust tube 29 follows down arrow 289 by the same amount, yet in opposite directions. The converse is true for the opposite steering motion. From simple geometry, it is known that the center point of a straight line drawn between the left side swivel end 273 and the right side swivel end 273, move in a horizontal arc despite having the ends move with equal and opposite vertical components. Hence, the center ball 282, which is also on the same vertical center plane between the left end and the right end, wants to also move on a horizontal arc. However, center ball 282 is also constrained to move in a vertical arc described by the fixed radius of the length of steering bracket arms 280 as measured between the center of center ball 282 and the axis of rotation about anchor pins 278. Each of the left and right steering anchors 281 is rigidly secured to the transom 23 providing a hinge base through which anchor pins 278 hingedly secure steering bracket arms 280 to the boat 20. Therefore, steering bracket arms 280 and center ball 282 are constrained to sweep up and down in a vertical arc about anchor pins 278 as the left and right swivel ends 273 ramp up and ramp down while fastened to the left and right thrust tubes 29.

A torsion tube 276 is rigidly connected to the left and right steering bracket arms 280 such that they move as a single unit without any torsional displacement of the left end relative to the right end. Center ball channel 277 is connected at the right and left ends to steering bracket arms 280 by channel pins 282 to allow center ball channel 277 to rotate freely about channel pins 275. The left and right steering rams 41 and the left and right center ball cups 283 are placed inside the slot of the center ball channel 277 on the left and right side respectively of the center ball 282. It is noted that steering ram 41, center ball cups 283, and center ball 282 are each larger in diameter than the slot width of center ball channel 277 and are thus held captive in sliding fashion in the center ball channel. Setscrew 274 allows tie bar 40 to be inserted into tie bar receiver 284 and locked in place. Center ball 282, ball stem 285, and tie bar receiver 284 may be fabricated as a rigid, integral assembly. To correctly adjust the steering system, the center ball channel 277 should be mounted on the centerline of the boat at the stern and the center ball 282 should be located at the midpoint of center ball channel 277. The right and left thrust tube 29 are set parallel, straight out the back of the boat, and set screw 274 is tightened on each side of the tie bar receiver 284.

In operation, as the propellers are lowered to increase the amount of propeller bite, both the left and the right thrust tubes 29 angle slightly down, and therefore swivel ends 273 are also slightly lowered. This simply lowers the location of the center of center ball 282 and everything connected assumes a lower operating position. Conversely, as the propellers are raised to decrease the amount of propeller bite, thrust tubes 29 and swivel ends 273 are also raised and the location of center ball 282, and all connected hardware, is also raised.

This assembly of components is designed to "float" in the vertical direction to changes in bite depth of the propeller and to allow the multiple thrust tubes, or propeller shaft carriers, to track along the surface of the bite bars. When viewed from the side, the linkage can be seen to function as a hinged, four bar, mechanical linkage in the shape of an irregular trapezium. As known from elementary engineering, a four bar linkage allows three of the links to "float" relative to the fourth link because it defines a non-rigid body.

If a third surface drive is located on the center plane as shown by 29', it can be connected to the steering system by a simple connecting bar and the steering system continues to perform as before.

The steering and tie bar system work equally well on outboard motors and inboard outboards (I/O) when the drives are mounted in the true vertical position, or even when the drives are mounted in the cambered position as disclosed herein. However, the amount of propeller bite of the different units should be controlled in unison, and the drives should rise and fall only in the vertical plane as part of the bite control system.

Just as it is true with automobile suspension and steering systems where proper "toe in" must be maintained for correct handling, so too, it is also important to recognize that when using multiple drive systems, the propeller shaft carriers should be set for a prescribed amount of "toe in". The amount of "toe in" is set by the distance as measured between the right and left ends of the tie bars 40. Therefore, in all of these embodiments, the bite control for each propeller works in unison with the sister drive in order to maintain the correct amount of "toe in".

Figure 25R:
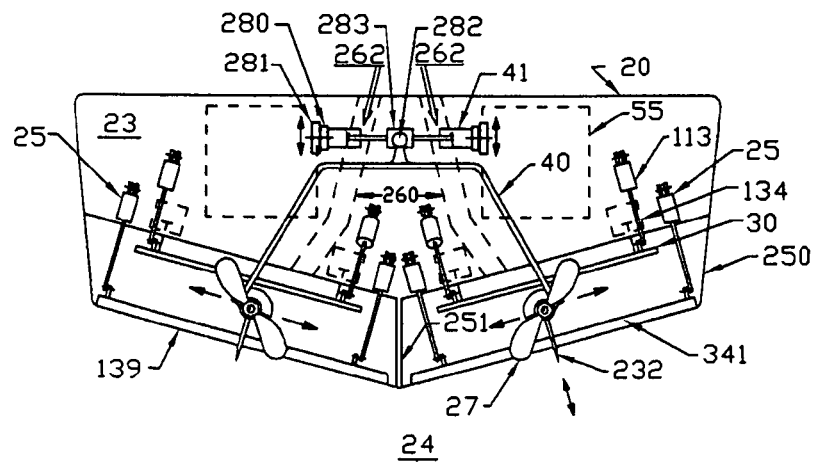
FIGS. 25R and 25S are rear (R) and side (S) views, respectively, of a boat with a hinged trim tab and an air duct for supplying ventilating air to the propeller of a surface drive.
Figure 25S:
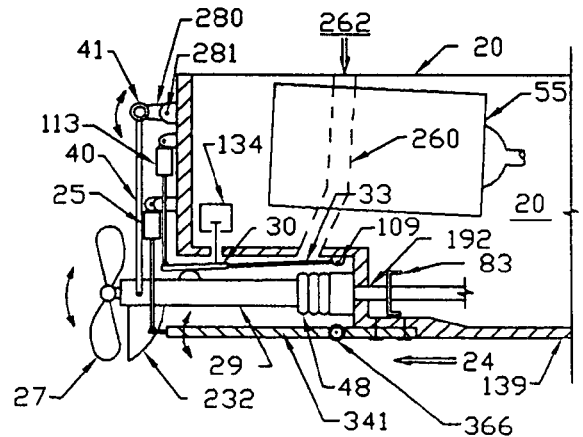

FIGS. 25R and 25S are rear (R) and side (S) views, respectively, of a boat with a hinged trim tab and an air duct for supplying ventilating air to the propeller of a surface drive. FIGS. 25R and 25S are similar to FIGS. 21R and 21S, respectively, except that the rigid trim tabs 241 are replaced with hinged trim tabs 341. The hinged trim tabs 341 include a hinge 366 located at the forward end of each trim tab 341 where it is mounted to the transom 23 of the boat. A pair of bite rams 25 are each hingedly attached between a rearward end of a respective trim tab 341 and the transom 23 for moving the trim tab 341 up and down. The flood walls 250 and the center support septums 251 are decoupled from the trim tabs 341.

Figure 26R:
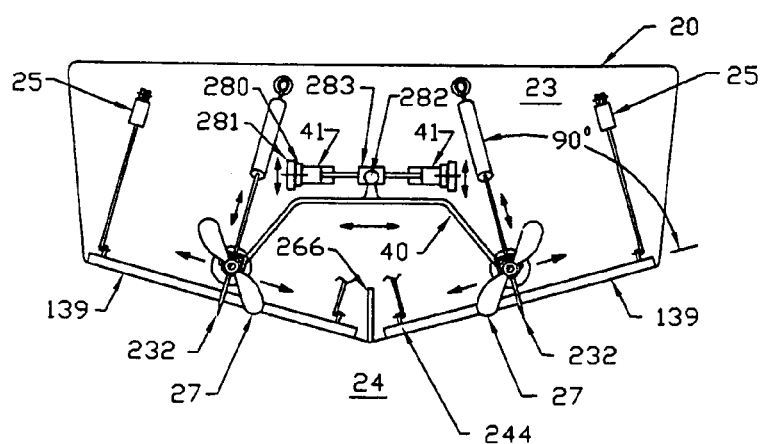
FIGS. 26R and 26S are rear (R) and side (S) views, respectively, of a boat with a hinged trim tab or hull bottom extension combined with a surface drive.
Figure 26S:
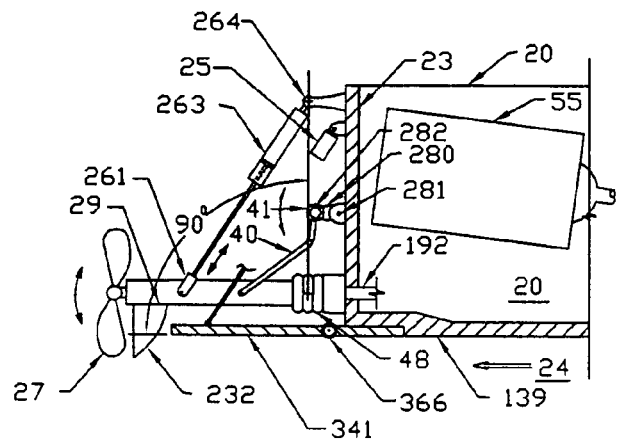

FIGS. 26R and 26S are rear (R) and side (S) views, respectively, of a boat with a hinged trim tab or hull bottom extension combined with a surface drive. FIGS. 26R and 26S are similar to FIGS. 22R and 22S, respectively, except that the rigid trim tabs 241 are replaced with hinged trim tabs 341. The hinged trim tabs 341 include a hinge 366 located at the forward end of each trim tab 341 where it is mounted to the transom 23 of the boat. A pair of bite rams 25 are each hingedly attached between a rearward end of a respective trim tab 341 and the transom 23 for moving the trim tab 341 up and down. The vertical brace walls 266 are decoupled from the trim tabs 341.

The operation of trim tabs in accordance with embodiments of the present invention may be understood in comparison to an airplane wing. In particular, the fluid dynamics of the water passing under a trim tab is similar to air passing below an upside down airplane wing. The lift generated by an airplane wing is due primarily to the curved upper surface of the wing. The lift caused by the air flowing over the wing is lost when the flow separates from that surface. The same is true of trim tabs running in water, except everything is upside down. The "lift" of the water on the present trim tab when in the up position is actually a sucking action of the water attempting to pull the trim tab down into the water, hence, this force imbalance causes the stern of the boat to go down and the bow to rise up. Here too, flow separation means loss of suck and is due to an adverse pressure gradient in the boundary layer. When the present trim tab is in the down position, it actually rides over the water in a water-skiing action and flow separation is not a problem because adverse pressure gradients do not have an opportunity to form. This skiing action of trim tabs according to the present invention riding up over the water raises the stern of the boat and pushes the bow down.

The shape of the operative bottom surface of trim tabs in accordance with the present invention is different from previously known trim tabs. The undersurface of bending flat plate trim tabs, such as those shown in FIGS. 8U and 8D, tends to flatten out in the direction of water flow. This shape is the natural and unavoidable result of mounting a flat plate of constant thickness, hence constant flexural stiffness, in a cantilever fashion and applying a deflecting force near the far edge. It is clearly the case of actual measured deflections of prior art trim tabs, that the bending is most pronounced at and near the point of cantilever and diminishes to virtually zero at the far edge. In contrast, the undersurface of a trim tab implemented in accordance with the present invention does not flatten out as much in the direction of water flow, but instead forms a progressive curve resulting in superior operation. The undersurface may be controlled to any desired curve, and especially to a non-flattening surface by varying the stiffness, or more correctly, the "flexural stiffness" of the trim tabs, in a regressive fashion from the forward cantilevered edge to the rearward end.

To explain the structural difference between prior art and present invention, it is necessary to understand "flexural stiffness", also called bending stiffness. The definition of flexural stiffness is well founded in the engineering science known as "Strength of Materials". Flexural stiffness is defined as the product of Young's modulus and the second moment of inertia of a body. The equations for deflections of cantilevered beams are well known and these equations assume elastic deformation and small deflections consistent with trim tabs in accordance with the present invention. The common simplified form of these deflection equations also assume a constant flexural stiffness and uniform distributed loads and simplified point loads, and is suitable for most engineering applications. These load simplifications are not always applicable in actual operation. The hydrodynamic load conditions on the underside of the trim tab are constantly changing and are non uniform and therefore, predicting the exact curvature and deflection of the underside of the trim tab, during operating conditions, is very difficult.

These deflection equations are derived from free body force diagrams and in their original form are very complex, but they are simplified by certain small angle approximations. These deflection equations are second order differential equations as functions of the load imposed and the length of the beam in the numerator, and of the flexural stiffness of the beam in the denominator. The common solution for this equation assumes a constant value of the flexural stiffness and it is a simple matter of calculating the first and second integral of the original function. In prior art, the flexural stiffness term is a constant. In contrast, the flexural stiffness term of the trim tabs implemented in accordance with the present invention decreases along the length of the trim tab and is defined as "regressive flexural stiffness". Flexural stiffness decreases by decreasing the thickness or the width of the trim tab, or otherwise the second moment of inertia, or the Young's modulus of the material. However, as with any equation, its value increases as the value of the denominator decreases. Therefore, because the denominator, that is the flexural stiffness, becomes smaller with increasing length, the value of the second derivative becomes larger with increasing length. And it follows, if the value of the second derivative is larger, so to will be the value of the first derivative, and likewise the value of the function itself. It is this distinction which present invention defines as a "progressive curve" and it is relative to the shape of the curve of prior art. That is to say, prior art trim tabs tend to concentrate the bending deflections near the forward end, whereas trim tabs in accordance with embodiments of the present invention tend to decrease those bending deflections near the forward end and instead tend to redistribute the bending deflections along the length of the bottom surface of the trim tab. For example, a trim tab according to the present invention having a severely regressive flexural stiffness would have a very strong curve at the rearward end. An important distinction is that modifying the flexural stiffness results in a novel deflection curve which improves the hydrodynamics of the trim tab.

There is also a hydrodynamic difference between trim tabs of prior art and trim tabs implemented in accordance with embodiments of the present invention. For a given end deflection, more of the lift of a prior art trim tab is close to the cantilever point where the bending is strongest as that is where the flow streamlines have the most divergence, and the lift decreases farther rearward where the surface flattens, as that is where the flow streamlines then tend to converge to parallel lines. Continuing to pull up on the rearward end ultimately causes the boundary layer to separate. Separation starts at or near the point of cantilever because that is where the flow streamlines have the strongest divergence. Conversely, for the same amount of end deflection, the "lift" of present trim tabs described herein is more distributed along the bottom surface of the trim tab. Continuing to pull up on the rearward end also ultimately results in boundary layer separation, but it does not occur as readily as with prior art trim tabs because the divergence of the flow streamlines is not as severe nor as concentrated in one small area as it is with prior art and therefore, improves boundary layer adhesion. Therefore, trim tabs in accordance with embodiments of the present invention can produce more lift while incurring the same amount of drag. Given two trim tabs of equal length and width, those implemented according to the present invention have a better lift capability over those of prior art. Trim tabs according to embodiments of the present invention have a better lift to drag ratio.

A trim tab in accordance with the present invention generates a greater amount of lift for a given surface area while causing the minimum amount of drag under operating conditions. Therefore, a smaller trim tab may be used to generate the same amount of lift moment on the boat. Also, because the curvature is shifted rearward, the lift is also shifted rearward. The equivalent vertical force vector is located at a place farthest rearward of the stern to cause the greatest moment arm on the boat and hence the greatest amount of "bow up" or "bow down" for a given amount of horizontal drag force. To be technically correct, the term "centroid" is the proper term for converting a distributed force to an equivalent single force acting at a given point. Centroid is from a mathematical equation which simplifies the resolution of distributed forces and reactions to aid in the solution of engineering problems. So, more correctly, the centroid of the hydrodynamic forces is at a location farther rearward on the trim tabs according to the present invention than is possible with prior art trim tabs, due to a different and improved shape of the undersurface.

As stated before, it is important that the shape of the operative undersurface of the trim tab be determined and controlled by the point forces of the trim rams and that the undersurface not be deflected from its intended shape despite the enormous and changing distributed hydrodynamic forces of the water. Consequently, it is desired that the trim tabs be sufficiently stiff and that the trim rams be sufficiently strong to hold these positions.

Optional fluid ejection ports may be provided to selectively detach the boundary layer by ejecting air or other gas from the underside of the trim tab near its leading edge to reduce the viscous drag forces. It is contemplated that such fluid ejection process be controlled and used only under certain operating conditions, although the present invention is not limited to any particular operating conditions. The present invention also contemplates boundary layer modifications by the ejection of water and polymer/water mixtures. Novel shape and array of diffusers at each ejection port ensure maximum effectiveness.

The present invention also contemplates merging a surface piercing drive and a trim tab or hull extension to function as an integral system. The trim tab may be rigid or resilient and may be adjustable or fixed or any combination thereof. In fact, a static trim tab or one configured according to prior art or even a hull extension is contemplated for this purpose or any combination thereof. In one embodiment, the problem of twin screw surface drives, wherein one propeller can dig into the water deeper than its twin and therefore cause the boat to momentarily crawl sideways, is effectively reduced or even eliminated by closely controlling the bite of each surfacing propeller under any operating condition, even under normal conditions, such as wave action, boat bounce, cornering, and speed changes. Trim tab configurations of all types are contemplated in the integral system, including prior art hinged and bending plate trim tabs, although superior results are achieved with trim tabs implemented in accordance with the present invention as disclosed herein.

In one configuration, bite control problems associated with surface drives is minimized by removing the skeg, if present, and locating the surfacing propeller on top of a trim tab and closest to the arcuate rear edge of the trim tab. The integral system also decreases "blow over" potential of surface drive boats by controlling and eliminating excessive bite.

Bite control also helps overcome the disadvantage of surface drives when the boat is struggling to get up on plane. The existence, of the trim tab below and in front of the propeller prevents water from "flooding" up around the propeller while trying to attain "hump speed". Flood skirts mounted on part of the surface drive control mechanism and flood walls mounted on part of the trim tabs further limit the "flooding" of the propeller.

In one configuration, the problem of side crawl of the surface propeller in dual drive, counter rotating applications may be minimized by controlling the propeller bite using trim tabs in accordance with the present invention and balancing the forces of one drive against its sister drive of opposite rotation. The problem of propeller side crawl with a single surface drive is solved by the use of bias fins in accordance with the present invention, which impart an instantaneous hydrodynamic side force that is equal and offsetting to the propeller side forces and is totally contained within the individual drive. Bias fins also tend to correct minor side crawl forces even on dual drives systems due to minor differences between the left side drive and the right side drive. Bias fins also tend to protect the propeller from submerged objects and to likewise protect submerged objects from the propeller.

In one configuration, the ever present danger of an exposed propeller is decreased by the addition of a people guard which attempts to minimize contact with the rotating blades while stopped or under way at low speeds, yet retracts at higher speed to allow the surfacing propeller to ventilate as designed for optimum performance.

Although a system and method according to the present invention has been described in connection with one or more embodiments of the invention, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A propulsion system for a boat having a hull with a longitudinal vertical centerplane and first and second bottom surfaces on either side of the centerplane and sloped relative to each other, said propulsion system comprising:
   a drive system comprising at least one propeller positioned rearward of the first and second bottom surfaces; and
   a propeller positioning system which constrains movement of said at least one propeller to follow a first path that is generally parallel to the first bottom surface and a second path that is generally parallel to the second bottom surface and wherein said first and second paths are independent.

2. The propulsion system of claim 1, wherein said propeller positioning system comprises a bite bar.

3. The propulsion system of claim 1, wherein said propeller positioning system comprises a bite ram.

4. The propulsion system of claim 1, wherein said drive system and said propeller positioning system comprises an outboard motor that is vertically cambered relative to the longitudinal vertical centerplane.

5. The propulsion system of claim 4, further comprising a jack plate mounted to said outboard motor and which moves said outboard motor in a generally vertical direction that is parallel to the longitudinal vertical centerplane.

6. The propulsion system of claim 1, wherein said drive system and said propeller positioning system comprises an inboard outboard with an outdrive which is vertically cambered relative to said longitudinal vertical centerplane.

7. The propulsion system of claim 6, further comprising a jack box which moves said outdrive in a generally vertical direction that is parallel to the longitudinal vertical centerplane.

8. The propulsion system of claim 1, wherein:
   said drive system comprises a propeller shaft is located within a propeller shaft carrier; and
   wherein said propeller positioning system comprises a linkage having a lower end attached to said propeller shaft carrier and an upper end mounted to an upper joint which is mounted to a stern of the boat, wherein said upper joint and an articulation pivot point of said propeller shaft are located on a longitudinal plane that is vertically cambered relative to said longitudinal vertical centerplane.

9. The propulsion system of claim 8, wherein said upper joint is adjustable to vary an amount of vertical camber of said longitudinal plane to adjust skew of at least one of said first and second paths.

10. The propulsion system of claim 8, wherein said upper joint and said articulating pivot point are located on a transverse plane that is athwartship and perpendicular to the longitudinal vertical centerplane and perpendicular to at least one of the first and second bottom surfaces.

11. The propulsion system of claim 8, wherein at least one of said upper joint and said articulating pivot point is adjustable relative to a transverse plane that is athwartship and perpendicular to the longitudinal vertical centerplane and perpendicular to a selected one of the first and second bottom surfaces to adjust swoop and soar of a corresponding one of said first and second paths.

12. The propulsion system of claim 8, wherein said linkage is extendable to adjust depth of immersion of said at least one propeller.

13. The propulsion system of claim 12, wherein said linkage comprises a bite ram.

14. The propulsion system of claim 1, wherein:
   said drive system, comprises:
      a first propeller positioned rearward of the first bottom surface and affixed to a first propeller shaft located within a first propeller shaft carrier which pivots about a first articulating pivot point; and
      a second propeller positioned rearward of the first bottom surface and affixed to a second propeller shaft located within a second propeller shaft carrier which pivots about a second articulating pivot point; and
   wherein said propeller positioning system comprises:
      a first propeller positioning system which constrains movement of said first propeller to follow said first path; and
      a second propeller positioning system which constrains movement of said second propeller to follow said second path.

15. The propulsion system of claim 14, further comprising a tie bar linking said first and second propeller shaft carriers together.

16. The propulsion system of claim 15, wherein said tie bar is located rearward of said first and second articulating pivot points.

17. The propulsion system of claim 16, wherein said tie bar is linked to said first and second propeller shaft carriers opposite of the longitudinal vertical centerplane.

18. The propulsion system of claim 14, wherein said propeller positioning system comprises:
   a first linkage having a lower end attached to said first propeller shaft carrier and an upper end mounted to a first upper joint which is mounted to a stern of the boat, wherein said first upper joint and a center point of said first articulating joint are located on a first line that is generally parallel to an orthogonal projection from the first bottom surface of the boat; and
   a second linkage having a lower end attached to said second propeller shaft carrier and an upper end mounted to a second upper joint which is mounted to a stern of the boat, wherein said second upper joint and a center point of said second articulating joint are located on a second line that is generally parallel to an orthogonal projection from the second bottom surface of the boat.

19. The propulsion system of claim 18, wherein said first and second linkages are each independently extendable to adjust relative depth of immersion of said first and second propellers, respectively.

20. The propulsion system of claim 19, wherein said first linkage comprises a first bite ram and wherein said second linkage comprises a second bite ram.

21. The propulsion system of claim 18, further comprising a tie bar linking said first and second propeller shaft carriers together.

22. The propulsion system of claim 21, wherein said tie bar is located rearward of said first and second articulating pivot points and linked to said first and second propeller shaft carriers opposite of the longitudinal vertical centerplane.

23. The propulsion system of claim 14, wherein said propeller positioning system comprises:
   a first bite bar interfacing said first propeller shaft carrier; and
   a second bite bar interfacing said second propeller shaft carrier.

24. The propulsion system of claim 23, wherein said first and second bite bars are each independently adjustable to adjust relative depth of immersion of said first and second propellers, respectively.

25. The propulsion system of claim 24, wherein said first and second bite bars are each skewable to vary immersion of said first and second propellers of said first and second paths, respectively, as a function of steering position.

26. The propulsion system of claim 23, further comprising a tie bar linking said first and second propeller shaft carriers together.

27. The propulsion system of claim 26, wherein said tie bar is located rearward of said first and second articulating pivot points and linked to said first and second propeller shaft carriers opposite of the longitudinal vertical centerplane.

28. The propulsion system of claim 14, further comprising a four-bar steering linkage linking said first and second propeller shaft carriers together.

29. The propulsion system of claim 28, wherein said four-bar steering linkage comprises:
said first and second propeller shaft carrier each having a rearward section that is rearward of said first and second articulation pivot points, respectively; and
a tie bar comprising a first end coupled to said rearward section of said first propeller shaft carrier and a second end coupled to said rearward section of said second propeller shaft carrier.

30. The propulsion system of claim 29, wherein said four-bar steering linkage further comprises:
said tie bar having a connection joint; and
a steering bracket arm having a first end coupled to said connection joint of said tie bar and a second end coupled to a steering anchor mounted to a stern of said hull.

31. The propulsion system of claim 30, wherein said four-bar steering linkage further comprises:
said steering anchor comprising first and second steering anchors;
said steering bracket arm comprising a first steering bracket arm hingedly mounted to said first steering anchor and a second steering bracket arm hingedly mounted to said second steering anchor;
a steering ram mounted between said first and second steering bracket arms and comprising a channel; and
said connection joint of said tie bar comprising a center ball in said channel of said steering ram.

32. A propulsion system for a boat having a hull comprising a generally flat bottom surface, said propulsion system comprising:
a drive system comprising a propeller affixed to a propeller shaft-which positions said propeller rearward of the bottom surface; and
a bite bar which constrains movement of said propeller to follow a path that is generally parallel to the flat bottom surface and which enables variable immersion of said propeller.

33. The propulsion system of claim 32, wherein the hull has a longitudinal vertical centerplane, wherein:
said drive system, comprises:
a first propeller affixed to a first propeller shaft which pivots about a first articulating pivot point; and
a second propeller affixed to a second propeller shaft which pivots about a second articulating pivot point; and
wherein said bite bar comprises:
a first bite bar which constrains movement of said first propeller to follow a first path that is generally parallel to the flat bottom surface and which enables variable immersion of said first propeller; and
a second bite bar which constrains movement of said second propeller to follow a second path generally parallel to the flat bottom surface and which enables variable immersion of said second propeller.

34. The propulsion system of claim 33, wherein steering of the boat is based on an immersion differential between said first and second propellers.

35. A boat, comprising:
a hull comprising a first and second bottom surfaces on either side of a longitudinal vertical centerplane and sloped relative to each other; and
a propulsion system, comprising:
a drive system comprising a propeller positioned rearward of said first and second bottom surfaces; and
a propeller positioning system which constrains movement of said propeller to follow a first path that is generally parallel to said first bottom surface and a second path that is generally parallel to said second bottom surface;
wherein said first and second paths are independent.

36. A boat, comprising:
a hull comprising a flat bottom surface; and
a propulsion system, comprising:
a drive system comprising a propeller positioned rearward of said bottom surface; and
a bite bar which constrains movement of said propeller to follow a path that is generally parallel to the flat bottom surface and which enables variable immersion of said propeller.

* * * * *